United States Patent
Goi et al.

(10) Patent No.: US 9,110,348 B2
(45) Date of Patent: Aug. 18, 2015

(54) OPTICAL ELEMENT AND MACH-ZEHNDER OPTICAL WAVEGUIDE ELEMENT

(71) Applicant: FUJIKURA, LTD., Koto-ku, Tokyo (JP)

(72) Inventors: Kazuhiro Goi, Sakura (JP); Kensuke Ogawa, Sakura (JP)

(73) Assignee: FUJIKURA, LTD., Tokyo (JP)

( * ) Notice: Subject to any disclaimer, the term of this patent is extended or adjusted under 35 U.S.C. 154(b) by 0 days.

(21) Appl. No.: 14/260,883

(22) Filed: Apr. 24, 2014

(65) Prior Publication Data

US 2014/0233878 A1 Aug. 21, 2014

Related U.S. Application Data

(63) Continuation of application No. PCT/JP2012/077761, filed on Oct. 26, 2012.

(30) Foreign Application Priority Data

Oct. 26, 2011 (JP) ................................ 2011-234964

(51) Int. Cl.
*G02B 6/122* (2006.01)
*G02F 1/21* (2006.01)
*G02F 1/225* (2006.01)
(Continued)

(52) U.S. Cl.
CPC .............. *G02F 1/2257* (2013.01); *G02B 6/122* (2013.01); *G02B 6/2935* (2013.01); *G02B 2006/12061* (2013.01); *G02B 2006/12097* (2013.01); *G02B 2006/12142* (2013.01);
(Continued)

(58) Field of Classification Search
CPC ....................................................... G02F 1/025
See application file for complete search history.

(56) References Cited

U.S. PATENT DOCUMENTS 6,298,177 B1 * 10/2001 House ............................... 385/3
6,584,239 B1 * 6/2003 Dawnay et al. ................... 385/2
(Continued)

FOREIGN PATENT DOCUMENTS

JP 2006-515082 A 5/2006
JP 2012-13935 A 1/2012
(Continued)

OTHER PUBLICATIONS

R. A. Soref et al., "Electrooptical effects in Silicon", IEEE Journal of Quantum Electronics, 1987, pp. 123-129, vol. QE-23, No. 1.
(Continued)

*Primary Examiner* — Jerry Rahll
(74) *Attorney, Agent, or Firm* — Sughrue Mion, PLLC

(57) ABSTRACT

Provided is an optical element including an optical waveguide including a core formed from: a rib part; and a first and second slab parts sandwiching the rib part. The first slab part includes a P-type region, the second slab part includes an N-type region, the rib part includes a P-type region which is in contact with the P-type region provided in the first slab part, and an N-type region which is in contact with the N-type region provided in the second slab part. The rib part includes a top portion which is located above the first and second slab parts and includes an undoped region formed from at least one of an intrinsic region and a low-concentration doping region which is doped at a dopant concentration 1/10 or less of a dopant concentration in at least one of the adjacent P-type region and the adjacent N-type region.

12 Claims, 22 Drawing Sheets

(51) Int. Cl.
  *G02B 6/12*    (2006.01)
  *G02B 6/293*   (2006.01)
  *G02F 1/015*   (2006.01)

(52) U.S. Cl.
  CPC .............. *G02B 2006/12159* (2013.01); *G02F 2001/0151* (2013.01); *G02F 2001/212* (2013.01); *G02F 2201/063* (2013.01)

(56) References Cited

U.S. PATENT DOCUMENTS

| | | | |
|---|---|---|---|
| 6,801,702 | B2 | 10/2004 | Day |
| 7,085,443 | B1 | 8/2006 | Gunn, III et al. |
| 7,136,544 | B1 * | 11/2006 | Gunn et al. ............... 385/3 |
| 8,520,985 | B2 * | 8/2013 | Park et al. ............... 385/3 |
| 2006/0008223 | A1 * | 1/2006 | Gunn et al. ............ 385/129 |
| 2006/0159383 | A1 * | 7/2006 | Jones ....................... 385/1 |

FOREIGN PATENT DOCUMENTS

| | | |
|---|---|---|
| JP | 2013-003236 A | 1/2013 |
| WO | 00/58776 A1 | 10/2000 |
| WO | 2004/088394 A2 | 10/2004 |

OTHER PUBLICATIONS

Sasikanth Manipatruni et al., "Ultra-low voltage, ultra-small mode volume silicon microring modulator", Optics Express, 2010, pp. 18235-18242, vol. 18, No. 17.

Kazuhiro Goi et al.,"10 dB Extinction Ratio 10 Gbps Silicon Mach-Zehnder Modulator", 2011 Nen IEICE Electronics Society Conference, Sep. 20, 2011, C-3-48, p. 170.

Ogawa K. et al, "Silicon Mach-Zehnder Modulator of Extinction Ratio beyond 10dB at 10.0-12.5 Gbps", ECOC Technical Digest, Sep. 19, 2011, pp. 1-3.

Thomson D. J. et al, "High speed silicon optical modulator with self aligned fabrication process", Optics Express, Aug. 27, 2010, pp. 19064-19069, vol. 18, No. 18.

Xiaoguang Tu et al., "Fabrication of low loss and high speed silicon optical modulator using doping compensation method", Optics Express, 2011, pp. 18029-18035, vol. 19, No. 19.

International Search Report of PCT/JP2012/077761 dated Jan. 29, 2013.

Communication dated Apr. 1, 2015 from the Japanese Patent Office in counterpart application No. 2013-540850.

* cited by examiner

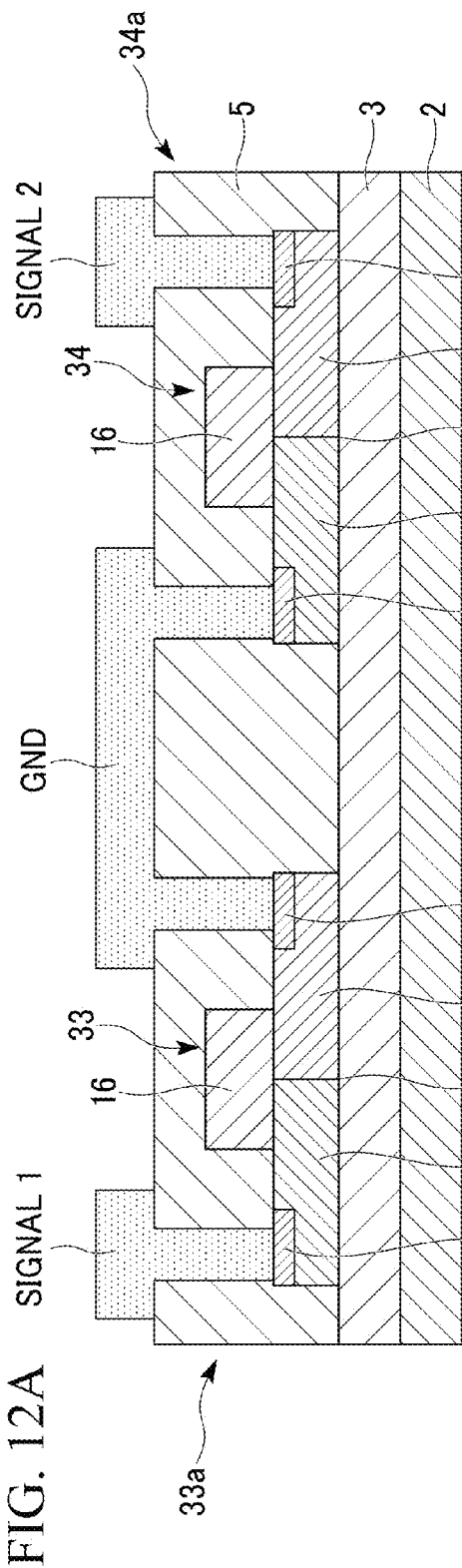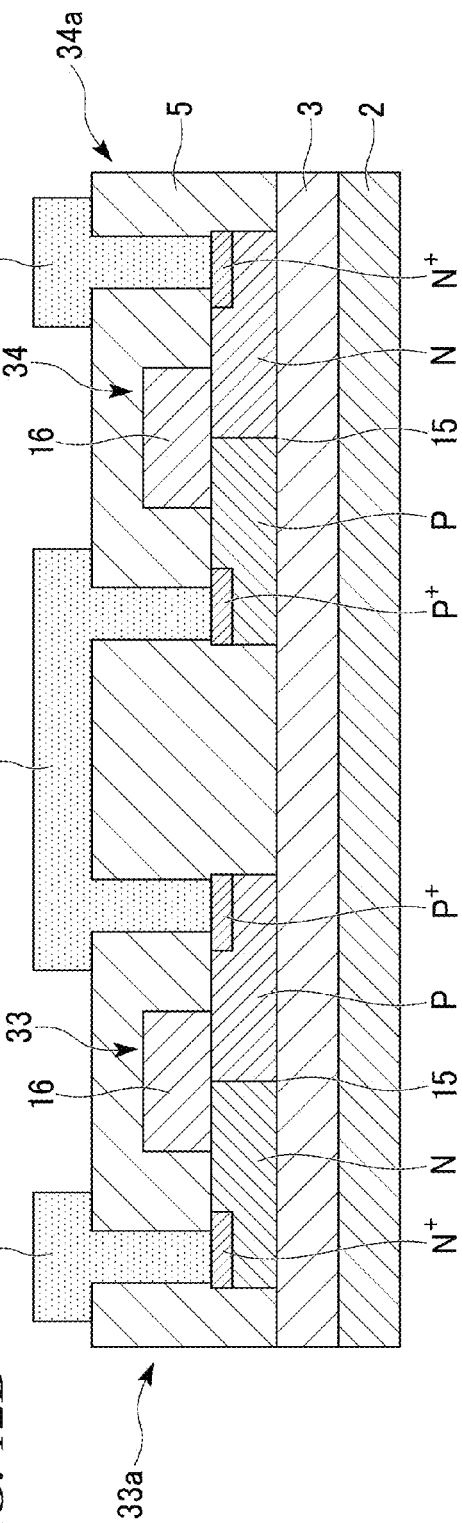

OPTICAL ELEMENT AND MACH-ZEHNDER OPTICAL WAVEGUIDE ELEMENT

CROSS REFERENCE TO RELATED APPLICATIONS

This application is a continuation application based on a PCT Patent Application No. PCT/JP2012/077761, filed Oct. 26, 2012, whose priority is claimed on Japanese Patent Application No. 2011-234964, filed Oct. 26, 2011, the entire content of which are hereby incorporated by reference.

BACKGROUND OF THE INVENTION

1. Field of the Invention

The present invention relates to an optical element and a Mach-Zehnder optical waveguide element using the same for use, for example, in optical communications.

2. Description of the Related Art

Recently, the amount of information in optical communications has been increasing. In order to cope with the increase in the amount of information, measures such as the improvement of the signal speed and increase of the number of channels using wavelength multiplex communication have been taken in various type of optical communication networks such as backbone network, metro network, and access network. However, such measures require more complicating systems for optical communications and causes problems in size, price, and increase of power consumption.

In addition, similar measures against the increase of the amount of information are required in data centers of which the number has been increasing recently. In the conventional communications between computers in a data center, electric signals are transmitted mainly using metal cables. However, for further high speed communication and reduction of power consumption, optical communications using optical fibers have been applied recently. Moreover, for communications inside an instrument, the introduction of optical communications becomes a challenge at each level, for example, a board and a CPU.

As a technology for solving such problems in optical communication networks and achieving the application of optical communications to a new field, an optical device using high refractive index materials such as silicon has attracted attention.

The wavelength of light in a medium is inversely proportional to the refractive index of the medium. Therefore, with silicon (Si) having a high refractive index of approximately 3.5, the dimension of the core (width, height, and the like) of an optical waveguide will be smaller. In addition, when using as its cladding a medium such as silica ($SiO_2$) of which the refractive index difference is large with respect to silicon, an optical waveguide with high confinement will be obtained. Such an optical waveguide will allow the bending radius to be smaller. Accordingly, it is possible to obtain a miniaturized optical device using an optical waveguide, and thus achieve further miniaturization with maintaining the functions, or accommodation of more functions (multi-functionalization) and higher density while maintaining the size.

Moreover, since high refractive index materials such as silicon are a semiconductor material, they are generally capable of being electrically controlled. With such semiconductor materials, it will be possible to realize characteristic-variable devices such as an optical modulator. Further, since optical devices in which a semiconductor is used for an optical waveguide core have a lot in common with conventional semiconductor devices such as CPU and memory in terms of technologies and equipment of manufacturing processes, it is expected to realize low-cost optical devices through mass production.

In addition, by integrating optical waveguides using semiconductor with conventional semiconductor devices using electrical signals on the same substrate, i.e., by replacing parts at which metal wirings are used with optical waveguides, it will be possible to achieve higher speed and lower consumption energy in instruments.

An optical modulator is one of major devices in optical communications for converting electrical signals into optical signals and has been studied by institutes as an element for achieving optical integrated devices as with the other devices.

The optical characteristics of silicon will be explained first. It is known that the refractive index of doped silicon in a communication wavelength region depends on the carrier density in the semiconductor. In accordance with R. A. Soref and B. R. Bennett, "*Electrooptical effects in Silicon*", IEEE J. Quantum Electron. QE-23, 1987, p. 123-129, in P-type and N-type silicons, the change in refractive index (n) and the change in extinction coefficient ($\alpha$) in silicon with respect to a light wavelength of 1.55 μm is expressed by the following Equation 1 and Equation 2, where the change in carrier density (numbers per 1 $cm^3$) of electrons and holes are $\Delta N_e$ and $\Delta N_h$, respectively.

$$\Delta n = -[8.8 \times 10^{-22} \times \Delta N_e + 8.5 \times 10^{-18} \times (\Delta N_h)^{0.8}] \quad \text{[Equation 1]}$$

$$\Delta \alpha = 8.5 \times 10^{-18} \times \Delta N_e + 6.0 \times 10^{-18} \times \Delta N_h \quad \text{[Equation 2]}$$

Therefore, the higher the carrier density in the doped silicon becomes, the lower the refractive index becomes; and the lower the carrier density becomes, the higher the refractive index becomes. Also, the higher the carrier density becomes, the higher the extinction coefficient becomes; and the lower the carrier density becomes, the lower the extinction coefficient becomes. It is noted that the light wavelength in a medium is inversely proportional to the refractive index of the medium as described above. Therefore, when changing the refractive index without changing the length of the optical waveguide, the phase will be changed after transmission through the optical waveguide.

Accordingly, in a low extinction coefficient region, if doped silicon is used for an optical waveguide and the carrier density is changed in some way, it will be possible to change the phase after transmission through the optical waveguide due to the change in density change. Such an optical waveguide will functions as an optical phase modulator.

In view of the above, optical phase modulators have been proposed in which a PN junction or a PIN junction is formed in a rib waveguide (e.g., refer to International Publication No. 00/58776 (Patent Document 1), U.S. Pat. No. 7,085,443 specification (Patent Document 2), and U.S. Pat. No. 6,801,702 specification (Patent Document 3)).

In Patent Document 1, a PN junction having a vertical boundary is formed in the rib of the rib waveguide. Around the junction boundary of the PN junction, there is a region called a depletion layer where few carriers exist. When applying reverse bias voltage to the PN junction, the depletion layer will widen, resulting in decrease of carriers in the rib part. With taking advantage of the decrease, it will be possible to obtain an optical phase modulator in which the carrier density is controlled by voltage.

Patent Document 2 discloses an optical phase modulator having a PN junction and FIG. 2 thereof shows an example of its application to a waveguide in which strips made of polysilicon is loaded (Strip Loaded Waveguide).

Patent Document 3 discloses an optical phase modulator in which a PIN junction is formed.

For silicon or the like, because the loss changes at the same time as refractive index change when the carrier density is changed (voltage application), the insertion loss depends on the target phase of light.

In addition, in the configuration shown in FIG. 2 of Patent Document 2, the boundary of the material is in the center of the rib waveguide. A boundary of a material inside an optical waveguide may cause light diffusion in the advancing direction of light due to ununiformity (roughness) of the boundary face and increase of insertion loss in the optical waveguide.

The present invention was made in view of the above-described circumstances, and the object thereof is providing an optical element and a Mach-Zehnder optical waveguide element using the same which make it possible to reduce the amount of change in loss due to the change in carrier density and reduce the insertion loss.

SUMMARY OF THE INVENTION

An optical element according to an aspect of the present invention includes an optical waveguide including a core formed from: a rib part; and a first and second slab parts which are located on both sides of the rib part so as to sandwich the rib part and thinner than the rib part, in which the rib part and the first and second slab parts of the core are integrally formed by a semiconductor single crystal, the first slab part includes a P-type region which is doped to be P type, the second slab part includes an N-type region which is doped to be N type, the rib part includes a P-type region which is in contact with the P-type region provided in the first slab part, and an N-type region which is in contact with the N-type region provided in the second slab part, the P-type region and the N-type region of the rib part are in contact with each other to constitute a PN-junction part, the rib part includes a top portion which is located above the first and second slab parts in a cross section perpendicular to the longitudinal direction of the optical waveguide, and the top portion of the rib part includes an undoped region formed from one of an intrinsic region and a low-concentration doping region which is doped at a dopant concentration 1/10 or less of a dopant concentration in at least one of the adjacent P-type region and the adjacent N-type region.

It may be arranged such that a boundary between the P-type region and the N-type region in the rib part is perpendicular to a bottom face of the core in the cross section perpendicular to the longitudinal direction of the optical waveguide.

It may be arranged such that the P-type region of the rib part is located at the same height as the first slab part, and the N-type region of the rib part is located at the same height as the second slab part.

It may be arranged such that the P-type region of the rib part extends to a position higher than a top face of the first slab part, and the N-type region of the rib part extends to a position higher than a top face of the second slab part.

It may be arranged such that a dopant concentration of a collective P-type region which is constituted by the P-type region of the first slab part and the P-type region of the rib part decreases towards the PN-junction part in the cross section perpendicular to the longitudinal direction of the optical waveguide, and a dopant concentration of a collective N-type region which is constituted by the N-type region of the second slab part and the N-type region of the rib part decreases towards the PN-junction part in the cross section perpendicular to the longitudinal direction of the optical waveguide.

It may be arranged such that the collective P-type region includes two or more regions which are different in dopant concentration from each other, and the collective N-type region includes two or more regions which are different in dopant concentration from each other.

It may be arranged such that the above-described optical element further includes a first electrode and a second electrode formed of metal, in which the P-type region of the first slab part is connected to the first electrode and includes a $P^+$ region which is higher in doping concentration than the P-type region of the first slab part, and the N-type region of the second slab part is connected to the second electrode and includes an $N^+$ region which is higher in doping concentration than the N-type region of the second slab part.

It may be arranged such that the first electrode and the second electrode are a traveling-wave electrode which is continuously formed along the longitudinal direction of the optical waveguide.

It may be arranged such that the traveling-wave electrode constitutes a coplanar line electrode or a slot line electrode.

Moreover, a Mach-Zehnder optical waveguide element according to an aspect of the present invention is a Mach-Zehnder optical waveguide element in which two arms are integrated on the same substrate, in which the optical element according to any one of claims 1-9 is used in an optical waveguide of at least one of the two arms.

A Mach-Zehnder optical waveguide element according to an aspect of the present invention is a Mach-Zehnder optical waveguide element in which two arms are integrated on the same substrate, in which, the above-described optical element is used in an optical waveguide of the two arms, and the first slab part of each optical element used in each optical waveguide is arranged between the two arms, or the second slab part of each optical element is arranged between the two arms.

According to some aspects of the present invention, in cross sections of the optical waveguide, the proportion of the region where the carrier density can be changed by voltage application can be increased in the doped region. That is, compared to the case where the entire region of the rib in a rib waveguide is doped, the change of the width of the depletion layer can be increased with voltage application, and thus it is possible to increase the proportion of the region, in which the carrier density can be changed, to the doped region.

Moreover, diffusion of carriers to the undoped region in the upper part of the rib which is formed integrally to the PN-junction part causes an area where the carrier density is low. Therefore, it is possible to reduce the amount of the change in loss due to the change in refractive index, i.e., the amount of the change in loss when the optical element is in operation.

Since the junction capacity per unit length of the optical waveguide will decrease, it is expected that the response time in a high frequency range is improved. In addition, since it is unnecessary to vary the doping concentration from the electrode to the slab part, it is possible to avoid an increase in the parasitic resistance.

Since the boundary is not present in the center of the rib waveguide, it is possible to reduce the insertion loss when used as an optical waveguide.

BRIEF DESCRIPTION OF THE DRAWINGS

FIG. 12A is a cross-sectional view showing an example of the phase shifter shown in FIG. 11A.

FIG. 12B is a cross-sectional view showing an example of the phase shifter shown in FIG. 11A.

DETAILED DESCRIPTION OF THE PREFERRED EMBODIMENTS

Figure 1A:
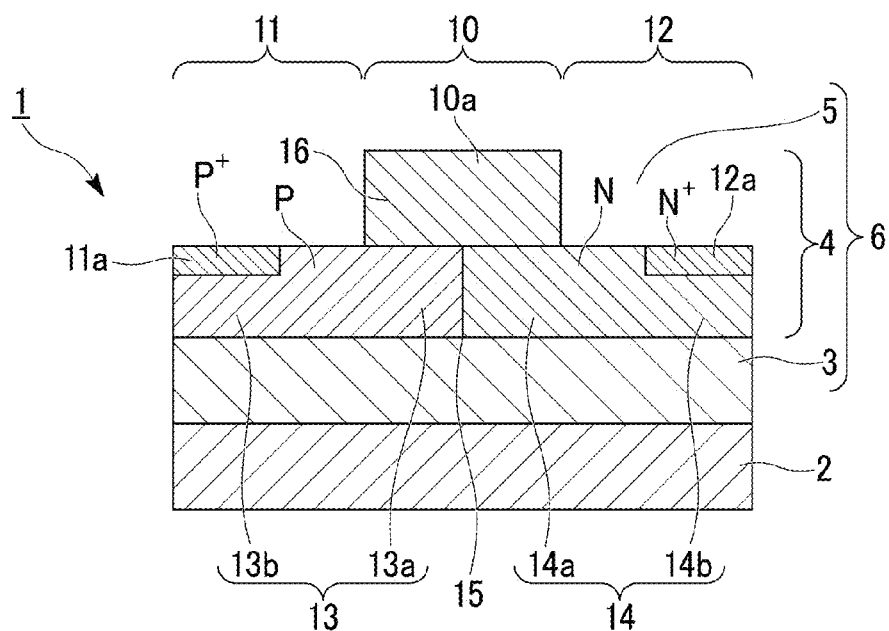
FIG. 1A is a cross-sectional view showing an optical element according to the first embodiment of the present invention.

The present invention will be explained based on preferred embodiments.

First, the insertion loss in the phase shifter of the optical phase modulator will be discussed.

The main purpose of providing the phase shifter is to shift the phase of an emitted light through transmission in a waveguide.

When performing phase modulation by changing the refractive index of the phase shifter, the phase shift at output point $\Delta \phi$ is expressed by $\Delta \phi = 2\pi L \Delta n_{eff}/\lambda$. Here, $\Delta n_{eff}$ is the change in effective refractive index $n_{eff}$ of the guided mode in the cross-section structure of the optical waveguide, L is the length of the phase shifter, $\lambda$ is the wavelength of the light, and $\pi$ is the circular constant. Accordingly, the phase shift at output point is expressed as an equation including a product of the change in effective refractive index $\Delta n_{eff}$ and the length of the phase shifter L.

On the other hand, the waveguide loss due to carrier absorption also depends on the length of the phase shifter L. With the effective extinction coefficient $\alpha$, the power $P_1$ of the emitted light (transmitted light) after transmitting the waveguide is expressed as $P_1 = P_0 \times \exp(-\alpha L) = P_0 \times e^{-\alpha L}$ where $P_0$ is the initial power. When the insertion loss of the phase shifter is expressed in decibel, the equation is expressed as $10 \log_{10}(P_0/P_1) = 10 \log_{10}(e^{\alpha L}) = \alpha L (10 \log_{10} e)$.

The effective extinction coefficient $\alpha$ changes in response to the change of the depletion layer when the phase shifter is in operation. When expressing the extinction coefficient while operating the phase shifter so as to widen the depletion layer as $\alpha_{eff}$ and the extinction coefficient while operating the phase shifter so as to narrow the depletion layer as $\alpha_{eff}+\Delta\alpha_{eff}$. $\alpha_{eff}$ is on the contribution from the region which is not affected by reverse bias application. In other words, it can be considered that $\alpha_{eff}$ is on the contribution from the region in which carriers are distributed but the carrier distribution does not change. On the other hand, it can be considered that $\Delta\alpha_{eff}$ is on the contribution from the region in which the carrier distribution is changed by change of reverse bias.

The loss goes back and forth between $\alpha_{eff}$ and $\alpha_{eff}+\Delta\alpha_{eff}$ during operation. Therefore, in order to reduce the insertion loss in the optical waveguide, it is required to reduce $\alpha_{eff}$ and $\alpha_{eff}+\Delta\alpha_{eff}$. In order to reduce the amount of the change in loss, it is required to reduce $\Delta\alpha_{eff}$. Accordingly, for addressing both issues, it is required to reduce the two parameters of $\alpha_{eff}$ and $\Delta\alpha_{eff}$.

For reducing the insertion loss of the phase shifter, the extinction coefficient $\alpha_{eff}$ itself is important as well as the contribution of the change in extinction coefficient $\Delta\alpha_{eff}$. It is considered that the insertion loss of the phase shifter can be reduced by shortening the length of the phase shifter L. However, the length of the phase shifter L is determined based on the acceptable range of bias voltage $V_{bias}$ in the optical phase modulator and the required modulation efficiency, and thus cannot be shortened automatically.

When expressing a required phase modulation amount as $\phi_{req}$, and change in effective refractive index due to the change in carrier density in the range of the bias voltage of applicable signals $V_{bias}$ as $\Delta n_{eff}$, the required length of the optical phase modulator $L_{req}$ is expressed by the following Equation 3. Equation 3 is obtained by deforming $\phi_{req}=2\pi L_{req}\Delta n_{eff}/\lambda$ which is obtained from the above-described equation expressing the phase shift at output point.

$$L_{req} = \frac{\phi_{req}}{2\pi}\frac{\lambda}{\Delta n_{eff}} \quad \text{[Equation 3]}$$

The loss of the optical phase modulator $\alpha_{eff}L_{req}(10\log_{10}e)$ is expressed by the following Equation 4 by substituting this into Equation 3.

$$\alpha_{eff}L_{req}(10\log_{10}e) = \phi_{req}\frac{\lambda}{2\pi}\frac{\alpha_{eff}}{\Delta n_{eff}}(10\log_{10}e) \quad \text{[Equation 4]}$$

From Equation 4, it is understood that when the required phase modulation amount $\phi_{req}$ and wavelength $\lambda$ are determined, the loss of the optical phase modulator will be determined by the ration between $\Delta n_{eff}$ and $\alpha_{eff}$.

Therefore, it is understood that in order to reduce the loss of the phase shifter, it is important, in the cross-section structure of the optical waveguide, to increase the proportion of the region, in which the carrier density is changed by voltage application, with respect to the entire carrier-doped region in the optical waveguide.

In other words, it can be said that, when using $F_1=\Delta n_{eff}/\alpha_{eff}$ as a figure of merit of the phase modulation amount, one may form a waveguide structure so as to have high $F_1$ in order to realize a low loss optical phase modulator.

On the other hand, it is sufficient to consider only the amount of the change in loss $\Delta\alpha_{eff}$ with regard to the amount of the change in insertion loss and the amount of change is expressed by the following Equation 5.

$$\Delta\alpha_{eff}L_{req}(10\log_{10}e) = \phi_{req}\frac{\lambda}{2\pi}\frac{\Delta\alpha_{eff}}{\Delta n_{eff}}(10\log_{10}e) \quad \text{[Equation 5]}$$

$\Delta n_{eff}$ and $\Delta\alpha_{eff}$ are derived from the change in carrier density, and therefore the same region contributes to the changes. Accordingly, it is understood that, in order to reduce the amount of the change in insertion loss, it is effective to reduce the ratio of the change in extinction coefficient to the change in effective refractive index $\Delta\alpha_{eff}/\Delta n_{eff}$ due to change in carrier density.

In this case, as with the above-described $F_1$, when using $F_2=\Delta n_{eff}/\Delta\alpha_{eff}$ for the amount of the change in insertion loss, it can be said that maximization of $F_2$ contributes to the reduction of the amount of the change in insertion loss.

It should be noted that, in designing an optical element (optical device) based on the ratio of the change in effective refractive index to the change in extinction coefficient (loss) $\Delta n_{eff}/\Delta\alpha_{eff}$ and the ratio of the change in effective refractive index to the extinction coefficient (loss) $\Delta n_{eff}/\alpha_{eff}$, it is actually difficult to measure the refractive index and the effective refractive index of doped materials. In accordance with the above-described $\Delta\phi=2\pi L\Delta n_{eff}/\lambda$, the phase shift amount $\Delta\phi$ is proportional to the change in effective refractive index $\Delta n_{eff}$, and thus the following Equation 6 and Equation 7 are obtained. In accordance with these equations, with the wavelength $\lambda$ and the length of the phase shifter L being determined, the ratio of the phase shift amount to the loss and the change in loss ($\Delta\phi/\alpha_{eff}$ and $\Delta\phi/\Delta\alpha_{eff}$) can be used as an index instead of the ratios of the change in effective refractive index to the loss and the change in loss ($\Delta n_{eff}/\alpha_{eff}$ and $\Delta n_{eff}/\Delta\alpha_{eff}$).

$$\frac{\Delta\phi}{\alpha_{eff}} = 2\pi\frac{L}{\lambda}\frac{\Delta n_{eff}}{\alpha_{eff}} \quad \text{[Equation 6]}$$

$$\frac{\Delta\phi}{\Delta\alpha_{eff}} = 2\pi\frac{L}{\lambda}\frac{\Delta n_{eff}}{\Delta\alpha_{eff}} \quad \text{[Equation 7]}$$

In order to solve the above-described issues of the reduction of the insertion loss and the reduction of the amount of the change in insertion loss, the lower part of a rib structure is doped and an undoped region is provided in the upper part of a rib structure in an aspect of the present invention.

According to this structure, it is possible to increase the proportion of the region, in which the carrier density is changed by voltage application, with respect to the entire carrier-doped region in the optical waveguide. Further, because of diffusion of carriers to the undoped region in the upper part of the rib, it is possible to reduce change in loss when changing the refractive index.

Such a structure provides the following effects.
(1) Compared to the structure where the entire region of a rib waveguide is doped, the change of the width of the depletion layer can be increased with voltage application, and thus it is possible to increase the proportion of the region, in which the carrier density can be changed, to the doped region.
(2) Diffusion of carriers to the undoped region in the upper part of the rib causes an area where the carrier density is low, and thus makes it possible to reduce the amount of the change in loss when changing the refractive index, i.e., the amount of the change in loss when in operation.
(3) Since the junction capacity per unit length of the optical waveguide will decrease, it is expected that the response time in a high frequency range is improved. In addition, since it is unnecessary to vary the doping concentration from the electrode to the slab part, the parasitic resistance will not increase.

An optical element 1 shown in FIG. 1A includes an optical waveguide 6 constituting a rib waveguide. A core 4 of the optical waveguide 6 is formed from a rib part 10 and slab parts 11 and 12. The slab parts 11 and 12 are thinner than the rib part 10 and located on both sides of the rib part 10 so as to sandwich it.

The first slab part 11 includes a P-type region 13b doped to be P type, while the second slab part 12 includes an N-type region 14b doped to be N type.

The rib part 10 includes a P-type region 13a which is in contact with the P-type region 13b provided in the first slab part 11, and an N-type region 14a which is in contact with the N-type region 14b provided in the second slab part 12. The P-type region 13a and the N-type region 14a are in contact with each other to form a PN-junction part 15. That is, the P-type region 13a and the N-type region 14a are in contact with each other at the PN-junction part 15.

The rib part 10 includes a top portion 10a which is located above the slab parts 11 and 12 in a cross section perpendicular to the longitudinal direction of the optical waveguide 6. The rib part 10 includes an undoped region 16 in at least part of the top portion 10a. It is preferable that the undoped region 16 extend from the top of the P-type region 13a and the N-type region 14a in the rib part 10 to the top face of the rib part 10 (boundary with respect to an upper cladding 5) as shown in FIG. 1A.

The undoped region 16 may be at least one of an intrinsic region and a low-concentration doping region which is doped at a dopant concentration 1/10 or less of that in the adjacent P-type region 13a and/or the adjacent N-type region 14a. Examples of the low-concentration doping region includes a low-concentration P doping region which is doped to be P-type at a dopant concentration 1/10 or less of that in the P-type region 13a adjacent to the undoped region 16, a low-concentration N doping region which is doped to be N-type at a dopant concentration 1/10 or less of that in the N-type region 14a adjacent to the undoped region 16, and a region which includes P-type and N-type dopants at a dopant concentration 1/10 or less of that in the adjacent P-type region 13a and N-type region 14a.

The rib part 10 and the slab parts 11 and 12 are integrally formed by a semiconductor single crystal. The P-type region 13a of the rib part 10 and the P-type region 13b of the first slab part 11 are integrated with each other to constitute a P-type region 13 (collective P-type region). On the other hand, the N-type region 14a of the rib part 10 and the N-type region 14b of the second slab part 12 are integrated with each other to constitute an N-type region 14 (collective N-type region).

In this way, the PN-junction part is formed in the optical waveguide and connected with electrodes through which voltage can be applied to change a depletion layer in the PN-junction part. When applying reverse bias voltage, the depletion layer will be widened to decrease the carrier density of the PN-junction part and increase the refractive index in the PN-junction part. As a result, the effective refractive index of the guided mode of the rib waveguide will be changed and the phase of the light, at the output point, transmitted through the waveguide will be shifted.

On the other hand, as shown in Equation 2, the introduction of carriers may not only change the refractive index but increase the extinction coefficient α. That is, when the waveguide is doped in order to cause the change in carrier density, the waveguide loss will increase. The increase of the phase shift amount and the reduction of the loss are in a trade-off relationship.

The insertion loss is one of the important characteristics of the phase shifter. The loss due to the introduction of carriers is one of the main factors of the insertion loss of the waveguide, and thus it is important reduce the insertion loss.

Although the optical characteristics of the material itself are expressed by Equation 1 and Equation 2, it is required to consider the mode profile of the light in order to calculate the effective refractive index of the guided light and the transmission loss. In the mode profile in the rib waveguide, the power density at the center part (especially the rib part) in the cross-section structure of the optical waveguide is higher. Therefore, change at the center part will cause greater change in refractive index than that caused by change at the periphery.

The carrier distribution in the PN-junction part is determined by an equilibrium condition between the diffusion current caused by the concentration gradient of the carriers and the drift current caused by the carriers, dopants, and external electric field. As a result, a depletion layer with no carriers is created in the PN-junction part.

At this time, in the cross-section structure of the waveguide, no space charge distribution is present and concentration gradient of the carriers is hardly shown in the structure interior sufficiently apart from the PN-junction part. However, electric fields are generated at the structure edges (surface parts) such as the top face of the rib. At the structure edges (surface parts) such as the top face of the rib, even being sufficiently apart from the PN-junction part, concentration gradient of the carriers is generated as is different from the structure interior.

When applying reverse bias voltage to the PN-junction part, carriers will decrease and the depletion layer will widen. Such a carrier decrease will occur at the edges of the structure as well as the above-described junction part, and thus it is understood that the carrier density will change when applying reverse bias voltage to the PN-junction part.

In the conventional structure shown in Patent Document 1 in which the PN junction part is provided in the entirety of the rib part, contribution of the change in carrier density in the PN-junction part at both edges to the change in refractive index is extremely small considering its mode profile of light because the PN junction is provided in a region where the power density of light is low (e.g., refer to the simulation results in FIGS. 24A-25B).

On the other hand, as shown in FIG. 1A, according to embodiments of the present invention in which the undoped region 16 is provided in the upper part of the rib, the boundary region (top end of the PN-junction part 15) is provided in the region where the power density is high in the mode profile of guided light. In addition, since the thickness of the region in the top face and bottom face where the carrier density changes is independent from the thickness of the doped region, when the doped region is made thinner, the weight of the top end of the PN-junction part 15 to the entirety can be increased. For this reason, the change in carrier density in not only the PN-junction part 15 but its periphery can be utilized. As a result, it is possible to increase the proportion of the region in which the carrier density can be changed among with respect to all the carriers. Accordingly, as shown in the simulation results in FIGS. 22A-23B for example, the region from the top end of the PN-junction part 15 to the undoped region 16, in which the carrier density is changed, dominates a large part.

It is noted that the way of performing the simulations in FIGS. 22A-25B will be described later.

Moreover, in a structure according to embodiments of the present invention, since the rib part 10 including the PN-junction part 15 and the undoped region 16, and the slab parts 11 and 12 are integrally formed by a semiconductor single crystal, and none of a crystal grain boundary and an electrically insulated layer is present between the PN-junction part 15 and the undoped region 16, the carriers will diffuse to the undoped region 16 in the upper part of the rib as well. In the upper part of the rib, since the electric field is weaker than that generated at the boundary between the P-type region and the N-type region, the carriers will diffuse over a wide range. Accordingly, the carrier density in that region will be low compared to the P-type region and the N-type region.

In a practical carrier density of $10^{16}$-$10^{18}$/cm$^3$ in view of insertion loss, the above-described ratio of the change in refractive index to the change in loss (refer to FIG. 17) will be higher in the N-type region than that in the P-type region. In addition, in the P-type region, the lower the carrier density is (especially, refer to the second embodiment described below), the ratio of the change in refractive index to the change in loss becomes higher. Hence, a structure according to the embodiments of the present invention makes it possible to achieve a phase shift due to voltage application to the low-carrier density region while reducing the change in loss.

Additionally, the junction capacity at the PN junction is one of elements preventing high-speed performance. However, according to embodiments of the present invention, since the area of the PN junction per unit length of the waveguide is reduced, it is possible to reduce the junction capacity. It is considered to increase the length of the waveguide in order to improve the modulation efficiency. However, in this case, because the junction capacity increases and the resistivity of the slab part decreases as the length of the waveguide increases, the effect of the modulation efficiency improvement will be canceled. Accordingly, it is understood that the reduction of the junction capacity per unit length contributes to high-speed performance.

<First Embodiment>

FIG. 1A is a cross-sectional view showing an optical element according to the first embodiment of the present invention. In addition, FIGS. 2A, 2B, and 3 show a configuration example in which electrodes are provided to the optical element.

Figure 2A:
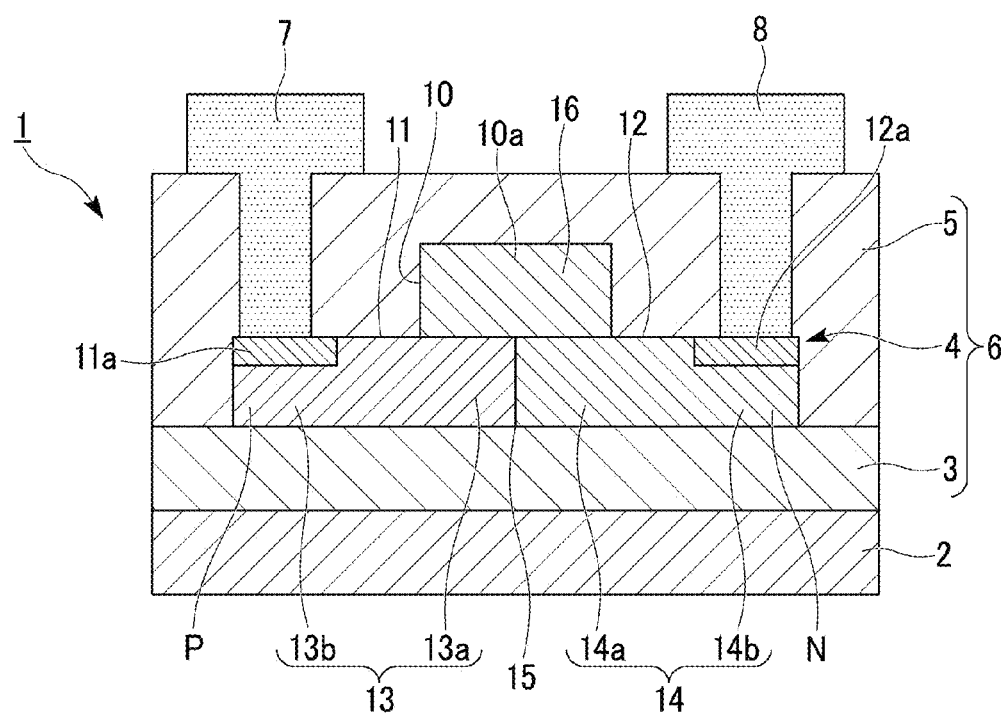
FIG. 2A is a cross-sectional view showing an example in which electrodes are provided to the optical element of FIG. 1A.
Figure 2B:
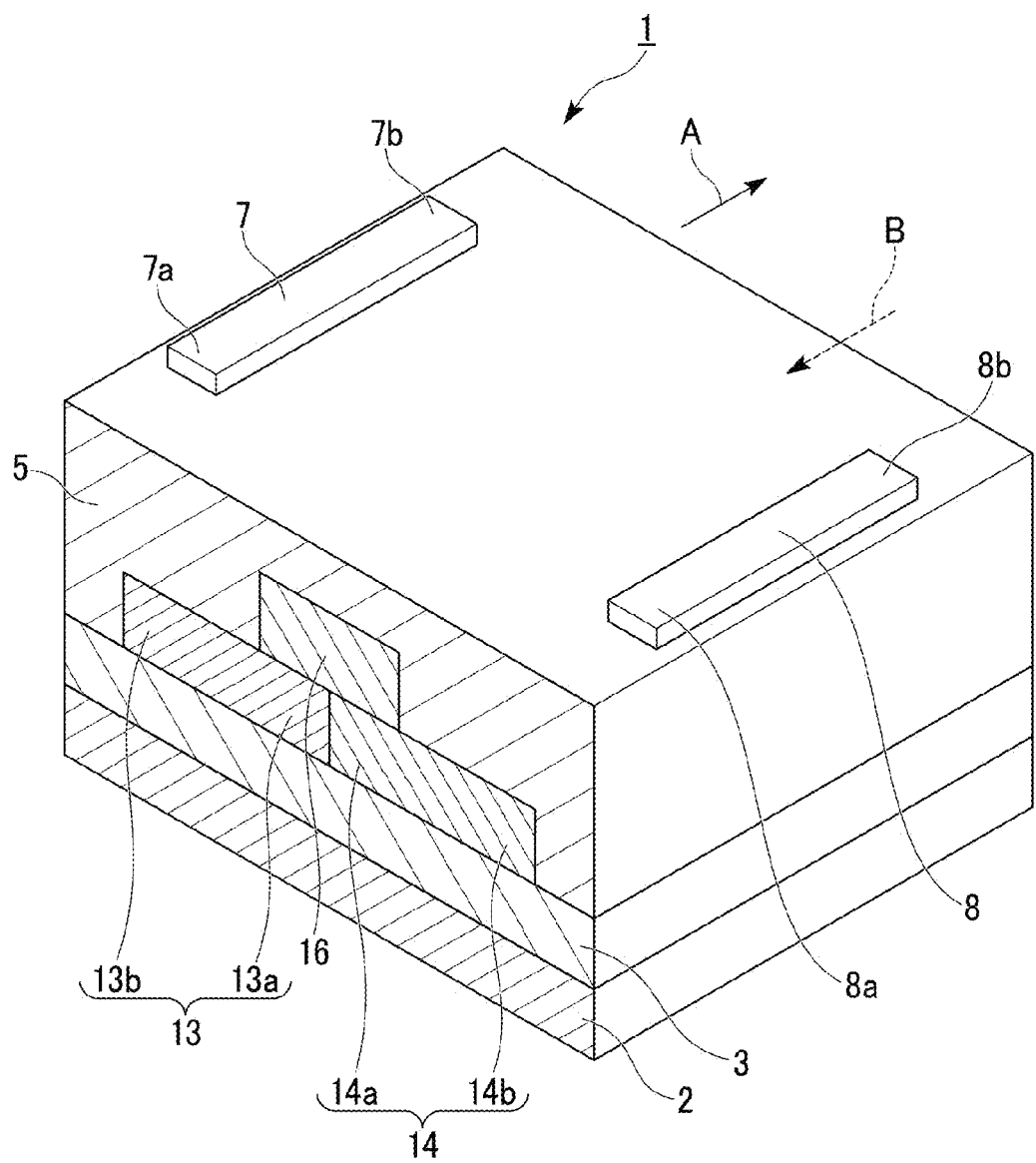
FIG. 2B is a perspective view showing an optical element of FIG. 2A.
Figure 3:
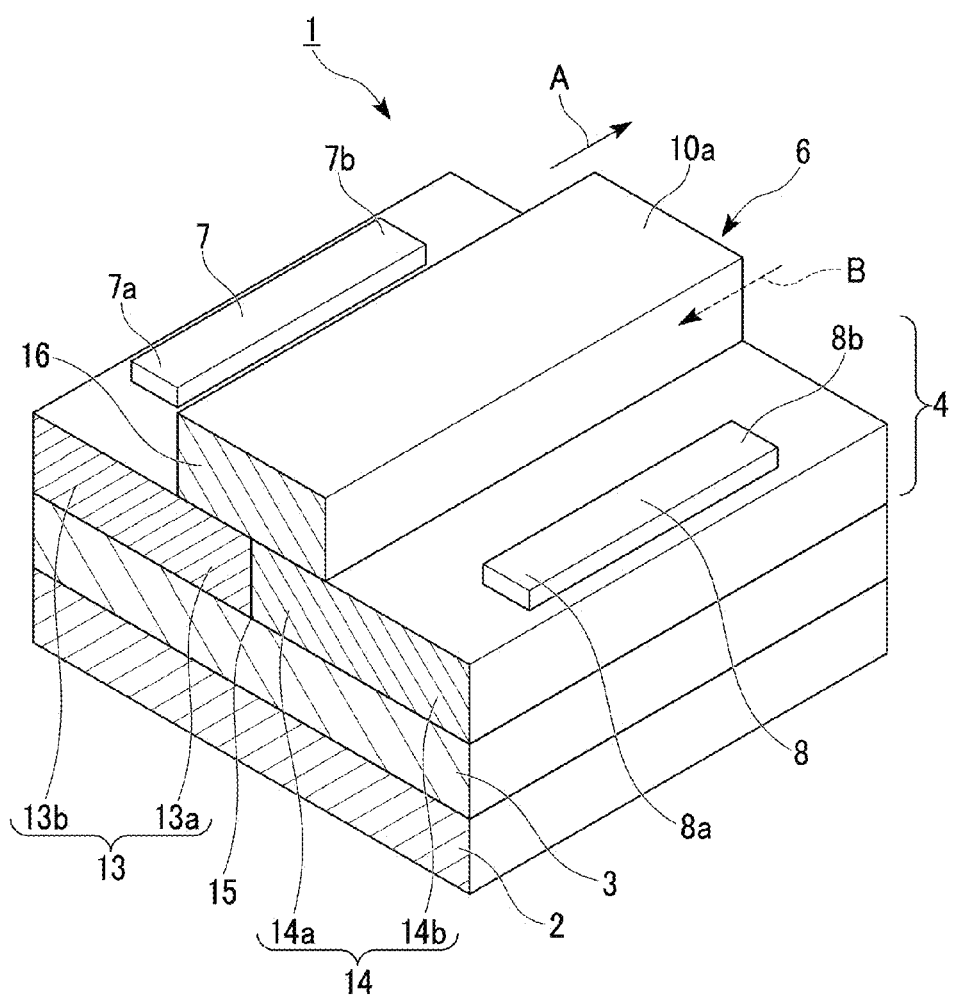
FIG. 3 is a perspective view showing an example in which electrodes are provided to the optical element of FIG. 1A.

FIG. 1A and FIG. 2A show a cross-sectional view showing a section perpendicular to the advancing direction of light (longitudinal direction of the optical waveguide). In the present embodiment, an SOI (Silicon On Insulator) substrate made of silicon (Si)-silica (SiO$_2$)-silicon (Si) can be used as a substrate for use in manufacturing. A lower cladding 3 of the optical waveguide 6 is formed from SiO$_2$ in the middle of the SOI substrate and the core 4 is formed from the upper Si layer. The lower Si layer forms a substrate 2.

The core 4 is a rib silicon waveguide and includes the rib part 10 which is thick at the center. Light transmitted into the waveguide will be distributed centering on the rib part 10.

Figure 1B:
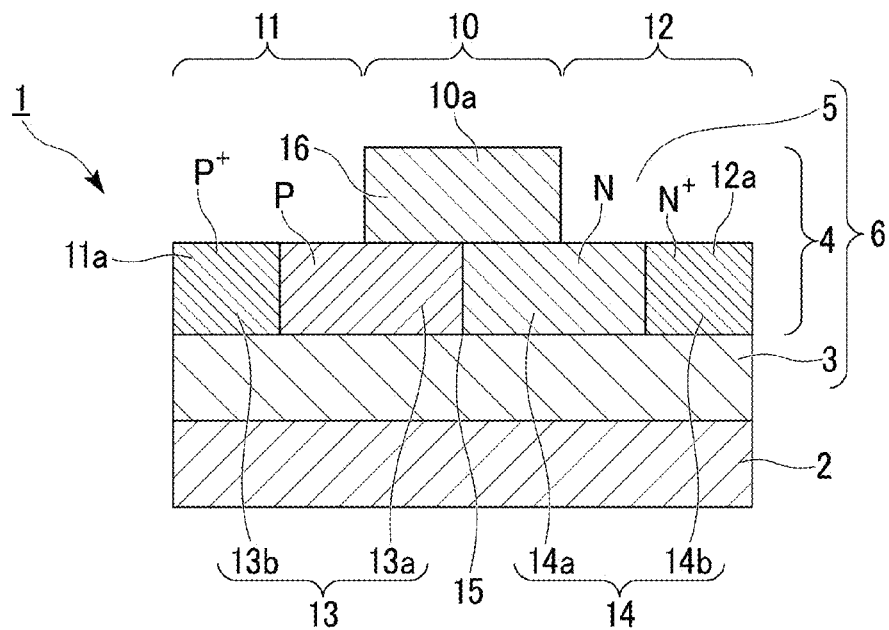
FIG. 1B is a cross-sectional view showing an optical element according to a modified example of the first embodiment of the present invention.

On the other hand, the slab parts 11 and 12 of thin thickness include contact parts 11a and 12a which are separated from the rib part 10 and in contact with an electrode. As shown in FIG. 1B, the contact parts 11a and 12a may be formed over the entire thickness of the slab parts 11 and 12. The contact parts 11a and 12a are doped with dopants at high concentration so as to form an ohmic contact with metal electrodes 7 and 8 (P$^+$ region, N$^+$ region). The material of the electrodes 7 and 8 are not particularly limited as far as it is capable of forming an ohmic contact with silicon materials, such as aluminum, and may be a single element or an alloy. It should be noted that the electrodes 7 and 8 are omitted in FIGS. 1A and 1B.

The upper cladding 5 of the optical waveguide 6 may be formed by laminating an additional low refractive index material such as SiO$_2$ and a resin material, or may be an air cladding without laminating a low refractive index material. The claddings 3 and 5 are formed of a material which is lower in refractive index than the core 4 so as to have an appropriate refractive index difference with respect to the core 4.

Part of the core 4 is doped to be P type or N type. In the present embodiment, the first slab part 11 is doped to be P type, while the second slab part 12 is doped to be N type. The dopants (impurities) for allowing a semiconductor to have conductivity may be suitably selected in accordance with the base medium of the semiconductor. For example, when the base medium is a group-IV semiconductor such as silicon (Si) and germanium (Ge) as in the present embodiment, the dopant for giving a P-type polarity may be a group-III element such as boron (B) and aluminum (Al), and the dopant for giving N-type polarity may be a group-V element such as phosphorus (P) and arsenic (As).

Regarding the arrangement of the doping regions, in the present embodiment, the P-type region 13 is arranged in the first slab part 11 and the adjacent lower part of the rib, while the N-type region 14 is arranged in the second slab part 12 and the adjacent lower part of the rib. The P-type region 13 and the N-type region 14 are in contact with each other in the rib part 10, and the depletion layer is created at the boundary.

In addition, the upper part of the rib is provided with the undoped region 16 to which doping is not intentionally performed. It may be possible that a small amount of dopants diffuses to the undoped region 16 unintentionally. Further, due to the manufacturing method of the material of a substrate such as an SOI substrate, it may be doped to be P type or N type depending on the material used for the substrate. For this reason, the undoped region 16 may include a small amount of dopants due to the material used for a substrate. However, in any case, the undoped region 16 is formed such that the dopant concentration therein is 1/10 or less, i.e., $10^{-1}$ times or less than the dopant concentration in the P-type region 13 or the N-type region 14 (average dopant concentration in the regions 13, 14). It is noted that, the dopant concentration in the undoped region 16 may be $10^{-2}$ times or less, or $10^{-3}$ times or less than the dopant concentration in the P-type region 13 or the N-type region 14.

Part of the slab parts 11 and 12 including the top surface, which is apart from the rib part 10, has higher doping concentration compared to the remaining part. This allows forming an ohmic contact with the electrodes 7 and 8.

FIG. 3 is a perspective view showing an optical element 1 according to the present embodiment. The phase shifter is configured such that the cross-section structure shown in FIG. 1A and FIG. 2A continues in the longitudinal direction of the optical waveguide. The length in the longitudinal direction is determined based on conditions such as required phase shift amount and applicable voltage range. For example, when the assumed operating voltage is 4 Vpp (peak to peak voltage) and the phase shift amount per unit length (1 mm) in the operating voltage is π/4 radian and if the required phase shift amount in the phase shifter is π/2 radian, the length of the device (the length of the phase shifter) may be set to be 2 mm. Alternatively, if the required phase shift amount is π radian, the length of the device may be set to be 4 mm.

The electrodes 7 and 8 may be a traveling-wave electrode. In this case, as shown in FIG. 3, the traveling-wave electrodes are arranged in the longitudinal direction so as to be parallel with the rib optical waveguide 6, and voltage is transmitted in the traveling-wave electrodes in the same direction as the light guided direction. In FIG. 3, for example, when guided light in the optical waveguide 6 transmits from the front side to the back side of the figure as shown with arrow A, a signal source is connected to the front ends 7a and 8a of the electrodes 7 and 8, a terminal is connected to the back ends 7b and 8b, and then voltage is applied to the electrode 7. To the contrary, when light transmits from the back side to the front side as shown with arrow B, a signal source is connected to the back ends 7b and 8b, a terminal is connected to the front ends 7a and 8a, and then voltage is applied to the electrode 7.

FIG. 2B shows a perspective view of the optical element 1 having the cross-section structure of FIG. 2A. In FIG. 2B, for example, when guided light in the optical waveguide 6 transmits from the front side to the back side of the figure as shown with arrow A, a signal source is connected to the front ends 7a and 8a of the electrodes 7 and 8, a terminal is connected to the back ends 7b and 8b, and voltage is applied to the electrode 7. When light transmits from the back side to the front side as shown with arrow B, a signal source is connected to the back ends 7b and 8b, a terminal is connected to the front ends 7a and 8a, and then voltage is applied to the electrode 7. In the example shown in FIG. 2B, electrodes 7 and 8 are continuously formed along the longitudinal direction of the optical waveguide 6. The electrodes 7 and 8 may be a traveling-wave electrode. In this case, for example, the electrodes 7 and 8 may constitute a slot line electrode in which a ground (GND) and signal electrodes are continuously formed along the longitudinal direction of the optical waveguide 6 with a predetermined gap therebetween. In the slot line electrode, it is possible to adjust the characteristic impedance of the line by adjusting the thickness of the electrodes and the gap between the electrodes.

Figure 2C:
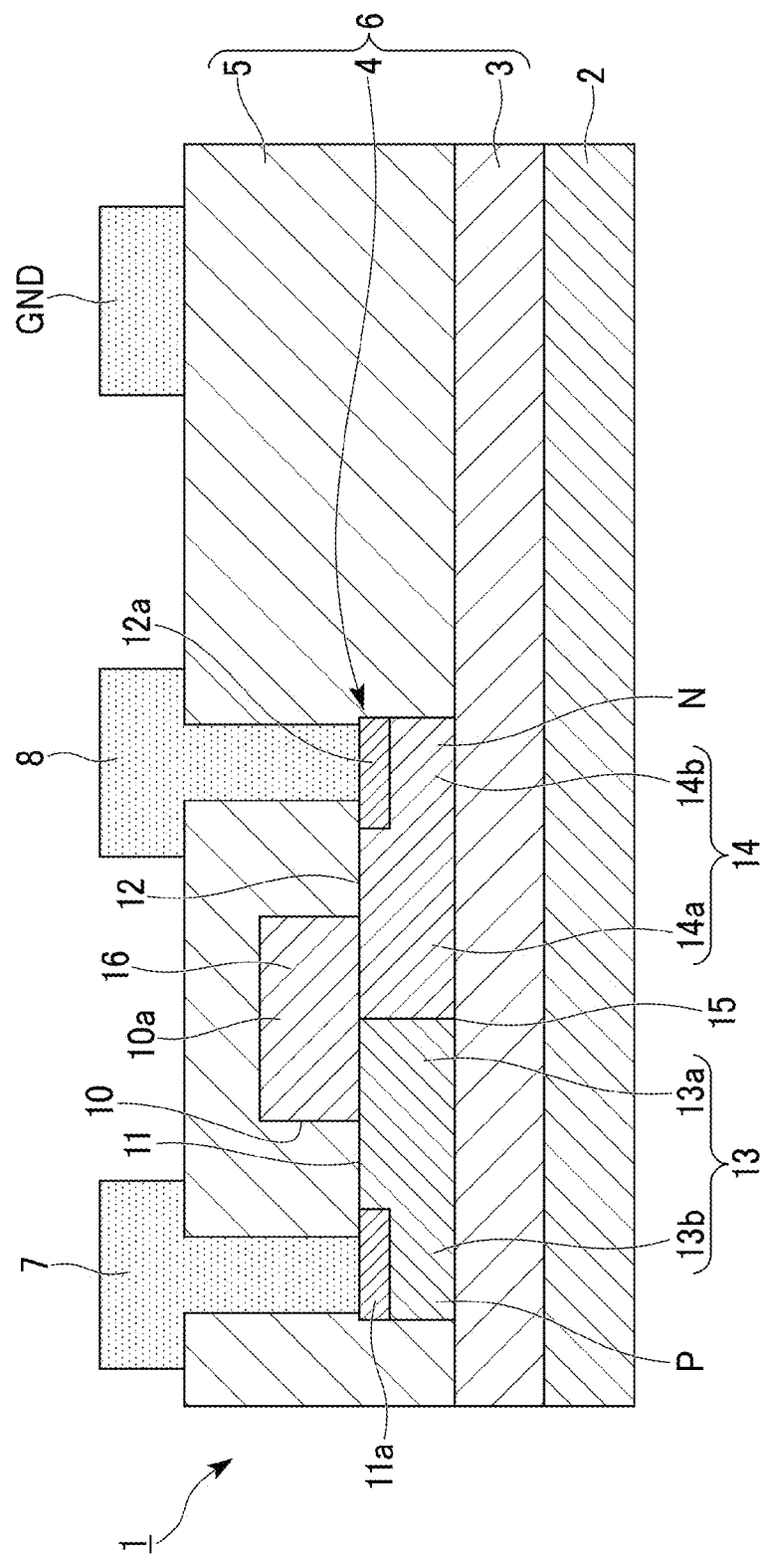
FIG. 2C is a cross-sectional view showing an example in which a ground electrode is provided to the optical element of FIG. 2A.

In the example of FIG. 2C, a ground (GND) is provided lateral to the electrode 8 in the cross section perpendicular to the longitudinal direction of the optical waveguide 6. In this case, the electrodes 7 and 8 with the ground (GND) may constitute a coplanar line electrode.

<Manufacturing Method of Optical Element>

Next, a manufacturing method of optical element 1 according to the above-described embodiment will be illustrated.

FIGS. 4A-4F show an example of the manufacturing method in sequence.

Figure 4A:
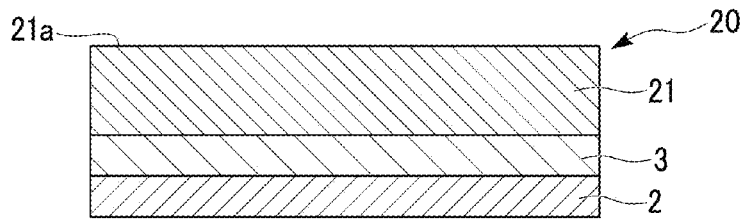
FIG. 4A is a cross-sectional view showing an example of a manufacturing step of the optical element of FIG. 2A.

(1) As shown in FIG. 4A, a multi-layer substrate 20 including the substrate 2, the lower cladding 3, and a single-crystal semiconductor layer 21 is prepared. Examples of the multi-layer substrate 20 include an SOI substrate made of Si—SiO$_2$—Si. In this case, the lower Si layer corresponds the substrate 2, the middle SiO$_2$ layer corresponds the lower cladding 3, and the upper Si layer corresponds the single-crystal semiconductor layer 21. The top face 21a of the single-crystal semiconductor layer 21 may be polished by Chemical Mechanical Polishing (CMP) or the like to a thickness with which the desired height of the rib will be obtained. The thickness of the single-crystal semiconductor layer 21 is not particularly limited, but is, for example, several tens nm to several hundred nm. A specific example thereof is 220 nm.

It should be noted that, the thickness ratio between the substrate 2, the lower cladding 3, and the single-crystal semiconductor layer 21 in the multi-layer substrate 20 of FIG. 4A does not show the actual thickness ratio.

Figure 4B:
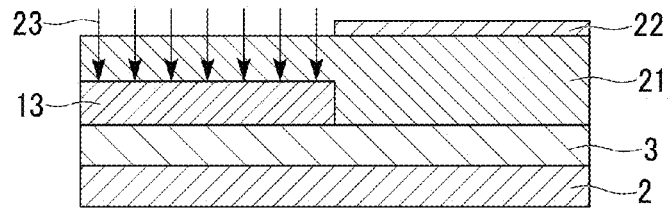
FIG. 4B is a cross-sectional view showing an example of a manufacturing step of the optical element of FIG. 2A.

(2) As shown in FIG. 4B, using a mask 22, the P-type region 13 is formed by P-type dopant implantation. At this time, the energy of implanted ions 23 is adjusted such that the implantation depth of the P-type dopant will be substantially the same as the thickness of the first slab part 11 formed in the following (4). A specific example thereof is implantation of boron (B) with the dosage of $5\times10^{12}$/cm$^3$ and the implantation energy of 40 eV. The mask 22 is arranged so as to cover a region where the P-type region 13 will not be formed.

Figure 4C:
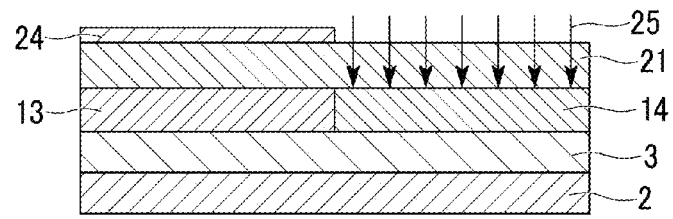
FIG. 4C is a cross-sectional view showing an example of a manufacturing step of the optical element of FIG. 2A.

(3) As shown in FIG. 4C, using a mask 24, the N-type region 14 is formed by N-type dopant implantation. At this time, the energy of implanted ions 25 is adjusted such that the implantation depth of the N-type dopant will be substantially the same as the thickness of the second slab part 12 formed in the following (4). A specific example thereof is implantation of phosphorus (P) with the dosage of $3\times10^{12}$/cm$^3$ and the implantation energy of 110 eV. The mask 24 is arranged so as to cover a region where the N-type region 14 will not be formed.

Figure 4D:
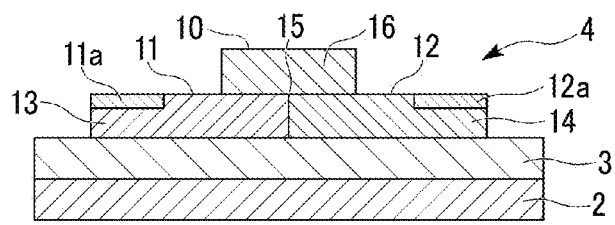
FIG. 4D is a cross-sectional view showing an example of a manufacturing step of the optical element of FIG. 2A.

(4) As shown in FIG. 4D, the core 4 is formed by etching so as to have a rib in the cross section. In addition, high-concentration doping regions (P$^+$ region, N$^+$ region) are formed by additional doping, the regions being contact parts 11a and 12a with metal electrodes. The upper part of the rib part 10 to which doping is not intentionally performed will be the undoped region 16.

As shown in the figure, when the P-type region 13 is at the same height position as the first slab part 11 and the N-type region 14 is at the same height position as the second slab part 12, the height position of the doping region in the rib part 10 will be the same as the height position of the doping region in the slab parts 11 and 12, and thereby it is possible to easily perform the ion implantation step.

When the boundary between the P-type region 13 and the N-type region 14 is perpendicular to the bottom face of the core 4 (top face of the lower cladding 3) in the cross section perpendicular to the longitudinal direction of the optical waveguide, it is possible to inhibit the P-type dopant and the N-type dopant from being mixed at the boundary by performing the ion implantation in a direction perpendicular to the surface of the substrate 2. It should be noted that, in the above-described manufacturing method, the ion implantation may be performed in a direction oblique to the substrate 2, and the boundary between the P-type region 13 and the N-type region 14 may be oblique to the bottom face of the core 4.

Figure 4E:
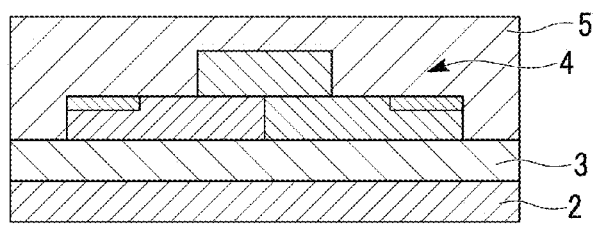
FIG. 4E is a cross-sectional view showing an example of a manufacturing step of the optical element of FIG. 2A.

(5) As shown in FIG. 4E, SiO$_2$ or the like is deposited on the core 4 (deposition) to form the upper cladding 5. When an air cladding is employed, the formation of the upper cladding 5 by deposition of SiO$_2$ or the like may be omitted. Alternatively, the upper cladding 5 may be formed by applying resin or other methods.

Figure 4F:
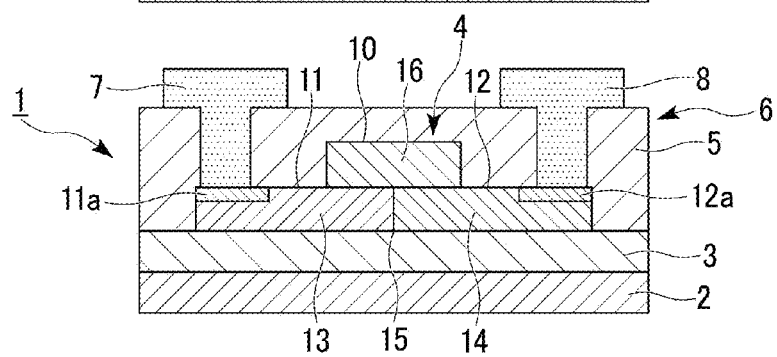
FIG. 4F is a cross-sectional view showing an example of a manufacturing step of the optical element of FIG. 2A.

(6) As shown in FIG. 4F, after forming contact holes in the upper cladding 5 for connecting the electrodes 7 and 8 with the contact parts 11a and 12a of the slab parts 11 and 12, the formed contact holes are filled with metal by sputtering or the like to form the electrodes 7 and 8. Examples of the material of the electrodes include aluminum (Al) and silicon alloys.

Through the above-described steps, it is possible to manufacture the optical element 1 for use as a rib phase shifter, in which the undoped region 16 formed from one of an intrinsic region and a low-concentration doping region remains in the upper part of the rib part 10 and the PN-junction part 15 is formed in the lower part of the rib part 10.

It should be noted that, although FIGS. 4A-4F show an example in which the P-type region 13 is at the same height position as the first slab part 11 and the N-type region 14 is at the same height position as the second slab part 12, the present invention is not limited to this. When the thickness of the doping region (P-type region 13 and N-type region 14) is thicker than the thickness of the slab parts 11 and 12 (refer to the sixth embodiment described later), it will be possible to obtain a structure in which the doping region extends to a position higher than the slab parts 11 and 12. In addition, by adjusting the configuration of the mask, the implantation depth, or the like, it will be possible to form dope regions with different height between the rib part 10 and the slab parts 11 and 12; for example, the height of the doping region in the rib part 10 is lower than the height of the doping region in the slab parts 11 and 12.

<Second Embodiment>

By calculating $\Delta n/\Delta\alpha$ based on the above-described Equation 1 and Equation 2 with neglecting the change in electron density $\Delta N_e$, it is found that $\Delta n/\Delta\alpha$ is approximately inversely proportional to the hole density $\Delta N_h$ to the power of 0.2 [i.e., $\Delta n/\Delta\alpha \propto 1/(\Delta N_h)^{0.2}$] in the P-type region. On the other hand, in the N-type region, with neglecting the change in hole density $\Delta N_h$, $\Delta n/\Delta\alpha$ stays approximately constant regardless of the electron density $\Delta N_e$.

Figure 17:
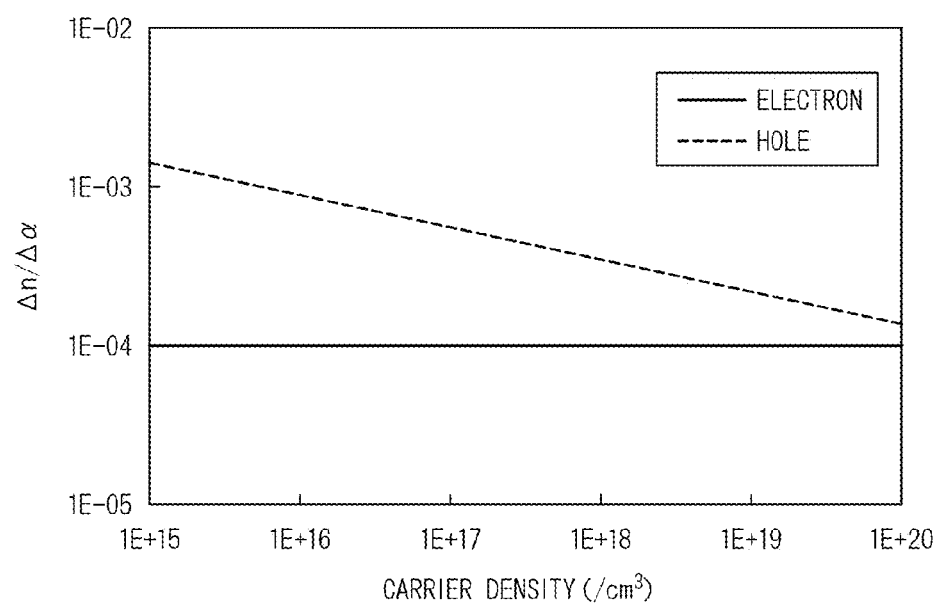
FIG. 17 is a graph showing an example of the relationship between the carrier density and the ratio $\Delta n/\Delta \alpha$.

These relationships are shown in a graph in FIG. 17. It is noted that the horizontal axis in FIG. 17 represents the carrier density, in which $\Delta N_e$ is used for electrons and $\Delta N_h$ is used for holes. In addition, the numbers in FIG. 17 are expressed in a manner that $1\times10^{\pm m}$ is 1E±m (±m is an integer).

As is clear from FIG. 17, since $\Delta n/\Delta\alpha$ is high in the P-type low-concentration region, it is possible to increase $\Delta n/\Delta\alpha$ and reduce the amount of the change in loss by increasing the proportion of the P-type low-concentration doping region in the carrier density-variable region.

Figure 5A:
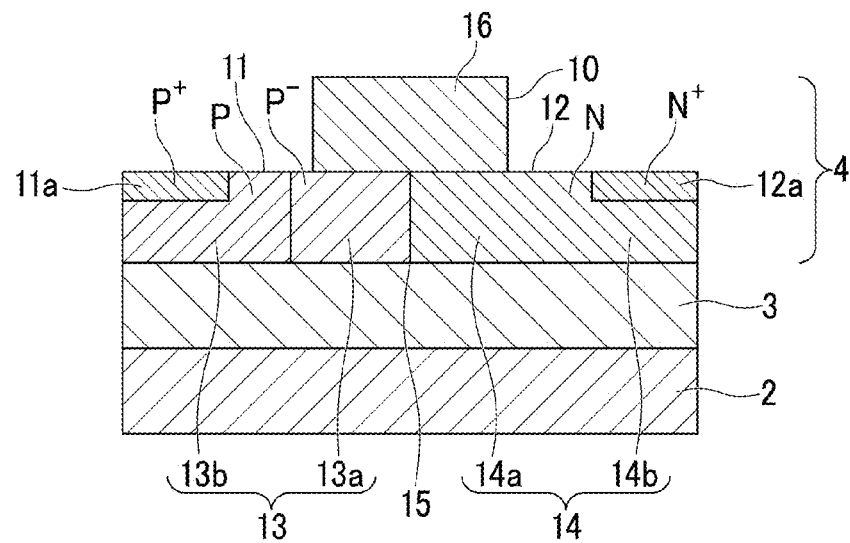
FIG. 5A is a cross-sectional view showing an optical element according to the second embodiment of the present invention.

When there is a difference in dopant concentration at the junction between the P-type region and the N-type region, the depletion layer in the PN-junction part widens towards an area where the dopant concentration is lower. Therefore, when the dopant concentration of the N-type region 14a in the lower part of the rib part 10 is higher than the dopant concentration of the P-type region 13a as shown in FIG. 5A, it is possible to achieve low loss and improve the modulation efficiency. It is noted that the P⁻ region provided in the lower part of the rib part 10 may be provided not only in the lower part of the rib part 10 but in a region adjacent to the rib part 10 of the slab part 11.

It is noted that, with regard to the relationship in dopant concentration between the P region, the P⁻ region, and the N region, the dopant concentrations may not necessarily be the same between the P region and the N region. In the present embodiment, the P⁻ region in contact with the N region has lower dopant concentration than the P region and the dopant concentration of the P⁻ region is lower than the dopant concentration of the N region.

Figure 5B:
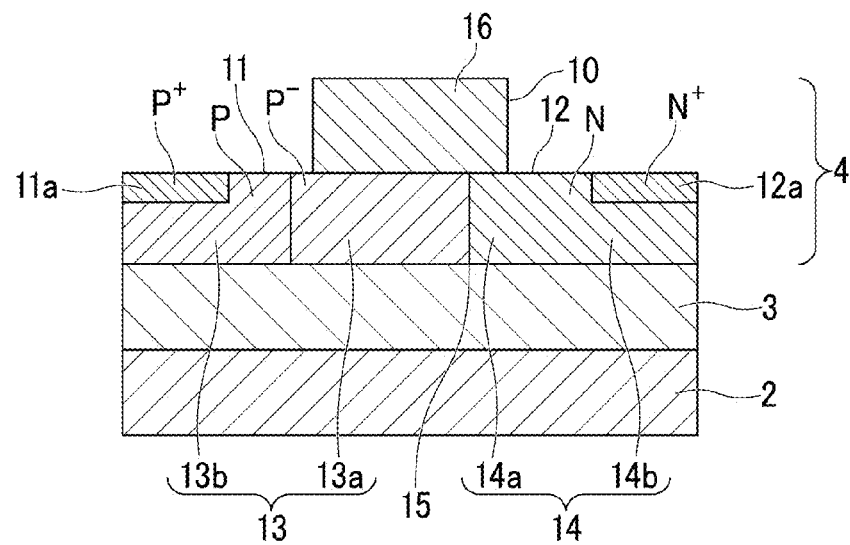
FIG. 5B is a cross-sectional view showing an optical element according to the second embodiment of the present invention.

Moreover, in the rib waveguide, with taking it into consideration that the power density of guided light is large in the center of the waveguide (rib part 10 and its vicinity), it may be possible to shift (displace) the center position of the PN-junction part 15 from the center of the rib part 10 in the width direction towards the second slab part 12 having the N-type region 14 as shown in FIG. 5B. In this case, since the P⁻ region of comparatively low dopant concentration expands, it is possible to reduce loss caused in the N region of comparatively high dopant concentration. Moreover, since the power density will change in a region in which the power density of guided light is high, it is possible to increase $\Delta n/\alpha$ and further reduce the loss.

<Third Embodiment>

In the first and second embodiments, the high-concentration doping region for making contact with the metal electrodes 7 and 8 is formed in the upper part of the slab parts 11 and 12. Since absorption of light in the metal material used for the electrodes 7 and 8 is large, it is required to separate the electrodes 7 and 8 sufficiently from the region in which guided light will be distributed, in order to reduce the absorption. However, as separating the electrodes 7 and 8 from the region in which guided light will be distributed, the distance between the electrodes 7 and 8 and the PN-junction part 15 becomes larger. This will increase the resistance value in the semiconductor between the electrodes 7 and 8 and the PN-junction part 15 and cause reduction of the response speed of the semiconductor constituting the core, or the like, resulting in deterioration of the high frequency characteristic.

Figure 6:
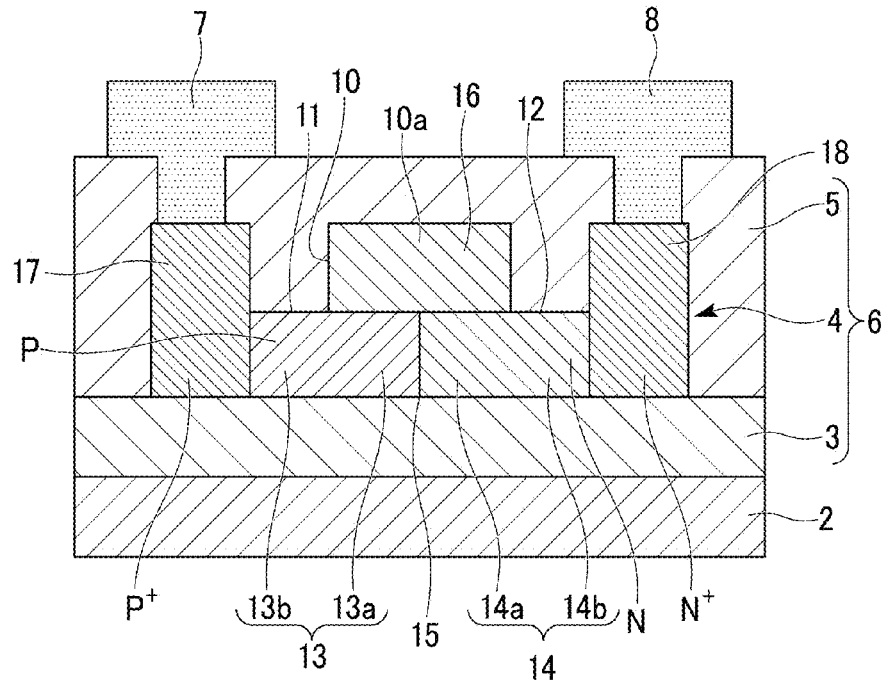
FIG. 6 is a cross-sectional view showing an optical element according to the third embodiment of the present invention.

In view of the above, as shown in FIG. 6, it may be possible to arrange contact parts 17 and 18 at a position further separated from the rib part 10, the contact parts 17 and 18 extending to a position higher than the top face of the slab parts 11 and 12. In FIG. 6, the contact parts extending to a position higher than the top face of the slab parts are denoted by reference numerals 17 and 18 for the purpose of distinguishing them from the contact part formed in the upper part the slab parts.

It is preferable that the height of the contact parts 17 and 18 be the same as or higher than the height of the top portion 10a of the rib part 10. In this case, since the metal material constituting the electrodes 7 and 8 is arranged at a higher position than the top face of the core 4, it is possible to arrange the contact parts 17 and 18 so as to be closer to the electrodes 7 and 8 compared to the case where the contact parts 11a and 12a is arranged in the upper part of the slab parts 11 and 12. This makes it possible to reduce the resistance value due to the slab parts 11 and 12, improve the response speed of the semiconductor constituting the core, and achieve high-speed performance.

In view of the arrangement of the P⁺ region and the N⁺ region which are a high-concentration doping region, it is preferable that the contact face between the P-type region 13 and the N-type region 14 in the slab parts 11 and 12 be perpendicular to the bottom face of the core 4 (boundary with respect to the lower cladding 3). In this case, since the distance between the PN-junction part 15 and the high-concentration doping region in which the resistance value is reduced by increasing the doping concentration will be reduced as a whole, it is possible to reduce the resistance value due to the slab parts 11 and 12, improve the response speed of the semiconductor constituting the core, and achieve high-speed performance.

When manufacturing an optical element according to the present embodiment by the method shown in FIGS. 4A-4F, it will be possible to perform etching such that the contact parts 17 and 18 extend to a position higher than the top face of the slab parts 11 and 12 by changing the etching depth in the single-crystal semiconductor layer 21. In a case where the height of the contact parts 17 and 18 are made to be greater than the thickness of the rib part 10, the thickness of the single-crystal semiconductor layer 21 prepared in FIG. 4A is equal to or greater than the target thickness of the contact parts 17 and 18. In a case where the height of the contact parts 17 and 18 is made to be equal to the height of the rib part 10, it may be arranged such that the etching is performed without etching the top face of the contact parts 17 and 18 and the top face of the rib part 10 to form the slab parts 11 and 12.

<Fourth Embodiment>

In the rib waveguide, the region in which the electric field will be most concentrated is the center part of the waveguide in the horizontal direction in the cross section thereof (rib part 10 and its vicinity). Therefore, the change in carrier density in the center part causes greater change in refractive index Δn, compared to change in carrier density at the periphery, which allows Δn/α to increase.

In a structure according the first embodiment shown in FIGS. 1A and 2A, the depletion layer is in the center of the waveguide. Since the depletion layer has a certain width when bias is zero (zero bias point), no carriers exists in the center even at the zero bias point (or the carrier density is extremely low). The carrier density will be changed at a distance from the center of the waveguide.

Figure 7:
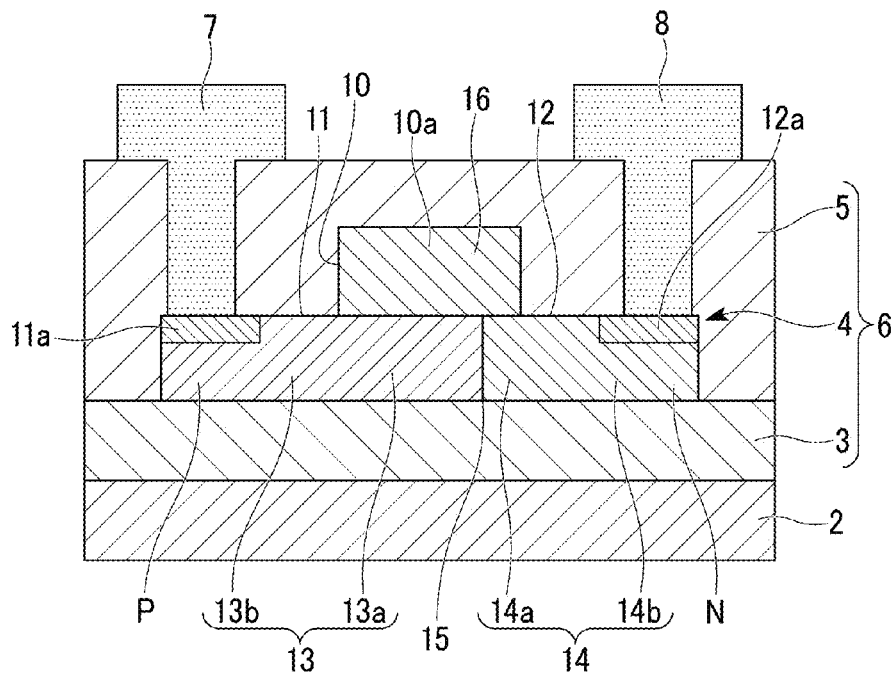
FIG. 7 is a cross-sectional view showing an optical element according to the fourth embodiment of the present invention.

In view of the above, as shown in FIG. 7, it may be possible to form the PN-junction part 15 such that the center position of the PN-junction part 15 is laterally shifted from the center in the width direction of the rib part 10. This makes it possible to allow the carriers in the center position of the waveguide at the zero bias point and maximize the change in carrier density in the center part within the target range of bias voltage. This will cause greater change in refractive index Δn, allow Δn/α to increase, and further reduce the loss. For obtaining the same effects as described above, it may be possible to shift the center position of the PN-junction part 15 towards the first slab part 11 including the P-type region 13, contrary to FIG. 7.

Further, as explained in the second embodiment, for reducing the amount of the change in loss during a phase modulation, it is effective to cause a modulation in an area in which the dopant concentration of the P-type region is low. Therefore, when the center position of the PN-junction part 15 is shifted towards the second slab part 12 including the N-type region 14, it will be possible to further reduce the amount of the change in loss during modulation.

<Fifth Embodiment>

In the cross-section structure of the waveguide, it is not necessary that the P-type region and the N-type region be uniform, and the dopant concentration may be distributed (varied) in the horizontal direction of the cross section.

For example, it may be possible to employ a configuration in which the dopant concentration of the P-type region 13 provided from the first slab part 11 to the rib part 10 decreases towards the N-type region 14 (PN-junction part 15) in the cross section perpendicular to the longitudinal direction of the optical waveguide 6. In this case, the P-type dopant concentration in the P-type region 13 may continuously change. Alternatively, the P-type dopant concentration may change stepwise such that the P-type region 13 includes two or more regions which have different P-type dopant concentrations.

Moreover, it may be possible to employ a configuration in which the dopant concentration of the N-type region 14 provided from the second slab part 12 to the rib part 10 decreases towards the P-type region 13 (PN-junction part 15) in the cross section perpendicular to the longitudinal direction of the optical waveguide 6. In this case, the N-type dopant concentration in the N-type region 14 may continuously change. Alternatively, the N-type dopant concentration may change stepwise such that the N-type region 14 includes two or more regions which have different N-type dopant concentrations.

Figure 8A:
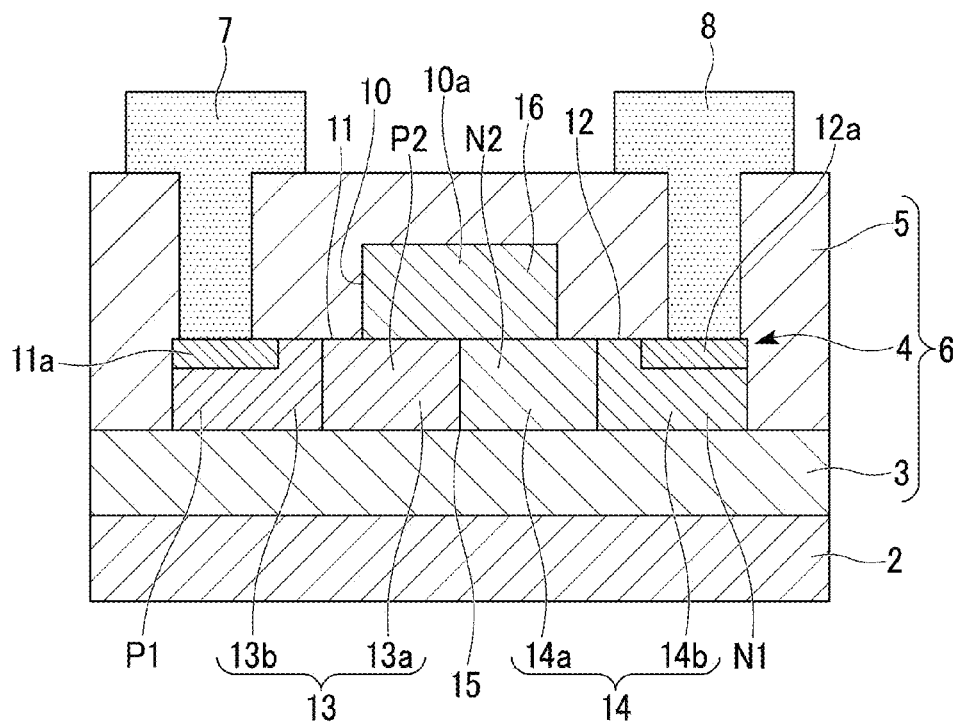
FIG. 8A is a cross-sectional view showing an optical element according to the fifth embodiment of the present invention.

FIG. 8A shows an example in which the dopant concentration is changed into two steps. Each of the P-type region 13 and the N-type region 14 is divided into two concentration regions (P1 region and P2 region; and N1 region and N2 region). For high-speed performance, it is effective to reduce the resistance value from the electrodes 7 and 8 to the PN-junction part 15. The resistance value can be reduced by increasing the doping concentration.

Increase of the doping concentration will increase the extinction coefficient (loss), but increase the change in refractive index Δn as well due to increase of the carrier density. Since the depletion layer will hardly reach a region distant from the PN-junction part 15, the carrier density will not change in that region. On the other hand, since part of guided light will generally reach the slab parts 11 and 12, the modulation efficiency due to the change in refractive index will not increase but only the loss will increase when increasing the doping concentration in that region. In view of the above, when putting the P1 region and the N1 region of high doping concentration as close as possible to the center part of the optical waveguide as long as not causing adverse effects on the loss, and arranging the P2 region and the N2 region of low doping concentration in the rib part 10 and its vicinity which are a light distribution region, it is possible to achieve both high-speed performance and reduction of loss.

It is noted that, with regard to the relationship in dopant concentration between the regions, the dopant concentrations may not necessarily be the same between the P1 region and the N1 region, and the dopant concentrations may not necessarily be the same between the P2 region and the N2 region. In the present embodiment, the P1 region has a dopant concentration higher than the P2 region and the N1 region has a dopant concentration higher than the N2 region.

The dopant concentration of the P1 region may be lower than or substantially equal to the dopant concentration of the $P^+$ region in the contact part 11a. In addition, the dopant concentration of the N1 region may be lower than or substantially equal to the dopant concentration of the $N^+$ region in the contact part 12a.

Figure 8B:
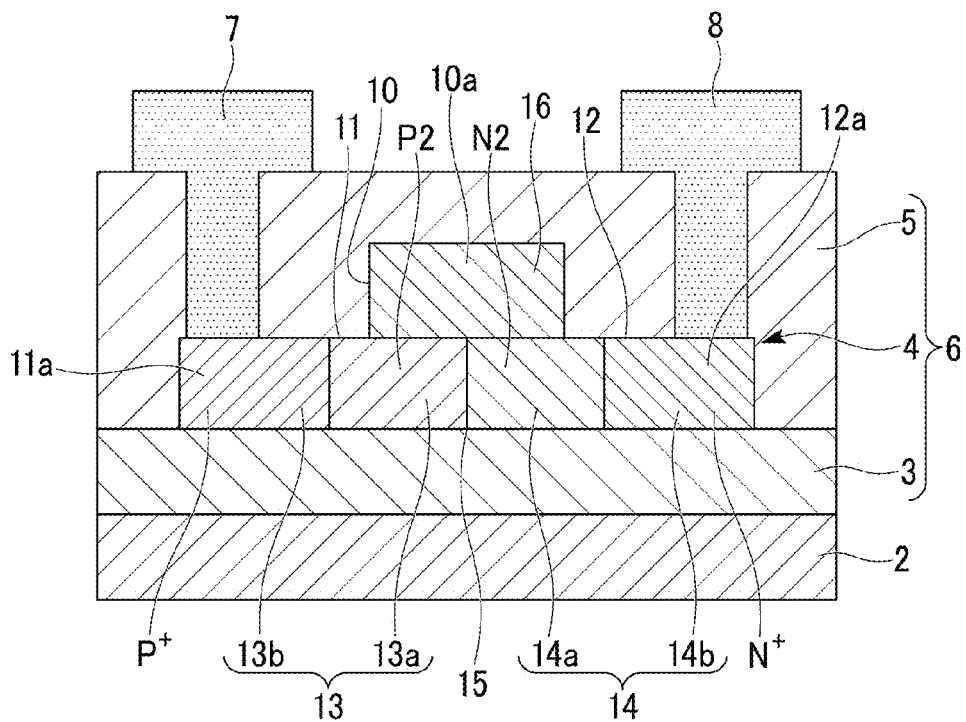
FIG. 8B is a cross-sectional view showing an optical element according to a modified example of the fifth embodiment of the present invention.

It is noted that, as shown in FIG. 8B, it may also be possible to employ a structure in which the contact parts 11a and 12a are formed over the entire thickness of the slab parts 11 and 12. In the example of FIG. 8A, separately from the P1 (N1) region, the contact part 11a (12a) i.e., the $P^+$ ($N^+$) region is formed for making an ohmic contact with the metal electrode 7 (8). On the other hand, in the example of FIG. 8B, the $P^+$ ($N^+$) region for making an ohmic contact with the metal electrode 7 (8) is formed over the entire thickness of the slab part 11 (12). That is, the example shown in FIG. 8B has a structure obtained by replacing the P1 region and the $P^+$ in FIG. 8A with a single $P^+$.

In the structure shown in FIG. 8B, each of the P-type region and the N-type region includes two regions which have different dopant concentrations ($P^+$ region, P2 region; and $N^+$ region and N2 region). It is noted that the dopant concentrations of the $P^+$ region, the P2 region, the $N^+$ region, and the N2 region in the example of FIG. 8l3 may be determined in the same way as the dopant concentration of the P1 region, the P2 region, the N1 region, and the N2 region in the above-described example of FIG. 8A. Accordingly, with the structure shown in FIG. 8B as well, it is possible to reduce the resistance value in the semiconductor between the electrodes 7 and 8 and the PN-junction part 15 while suppressing loss in the center part of the optical waveguide.

In addition, according to the structure show in FIG. 8l3, it is possible to form the $P^+$ ($N^+$) region and the P1 (N1) in the structure of FIG. 8A at once. In particular, when the thickness of the slab parts 12 and 13 are thin, the $P^+$ ($N^+$) region can be formed over the entire thickness of the slab part 11 (12) with a single implantation, which makes it possible to reduce the number of implantation.

<Sixth Embodiment>

Figure 9:
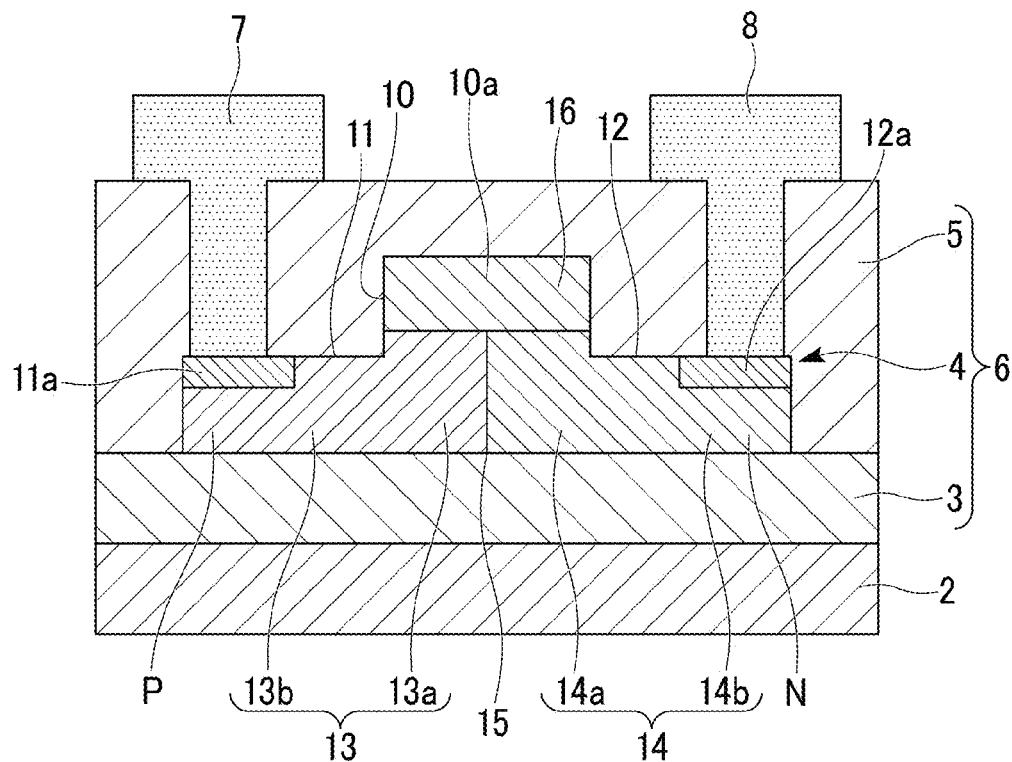
FIG. 9 is a cross-sectional view showing an optical element according to the sixth embodiment of the present invention.

In the embodiments shown in FIG. 9, the doping region in the rib part 10 extends to a position higher than the top face of the slab parts 11 and 12.

In the manufacturing method show in FIGS. 4A-4F, when adjusting the ion implantation conditions to obtain a greater doping depth and adjusting the etching conditions of the slab parts 11 and 12 such that the upper part of the doping region in the slab parts 11 and 12 is removed, it will be possible to achieve the cross-section structure as shown in FIG. 9. That is, it is possible to achieve a cross-section structure in which the P-type region 13a of the rib part 10 extends to a position higher than the top face of the adjacent first slab part 11 and the N-type region 14a of the rib part 10 extends to a position higher than the top face of the adjacent second slab part 12.

According to the present embodiment, regardless of the thickness of the slab parts 11 and 12, it is possible to adjust the height of the doping region of the rib part 10 in conformity with the light distribution profile and achieve a modulation with low loss. For example, when the thickness of the rib part 10 (i.e., the thickness from the bottom face of the core; refer to $T_r$ of FIG. 18) is thick, the distribution center of guided light may be at a higher position than the top face of the slab parts 11 and 12. In this case, it is preferable to arrange the boundary between the doping region and the undoped region in the vicinity of the distribution center of guided light.

<Ring Resonator>

The optical element according to the above-described embodiments can be used as a waveguide in a ring resonator. For example, the document (Optics Express Vol. 18, 18235-18242) discloses a g ring resonator using a silicon waveguide. The optical element according to the above-described embodiments is applicable as the ring modulator in the g ring resonator. It should be noted that the shape of the ring is not necessarily a circle but may be anything as long as the starting point and the end point are connected to each other.

<Mach-Zehnder Optical Waveguide Element>

Figure 10:
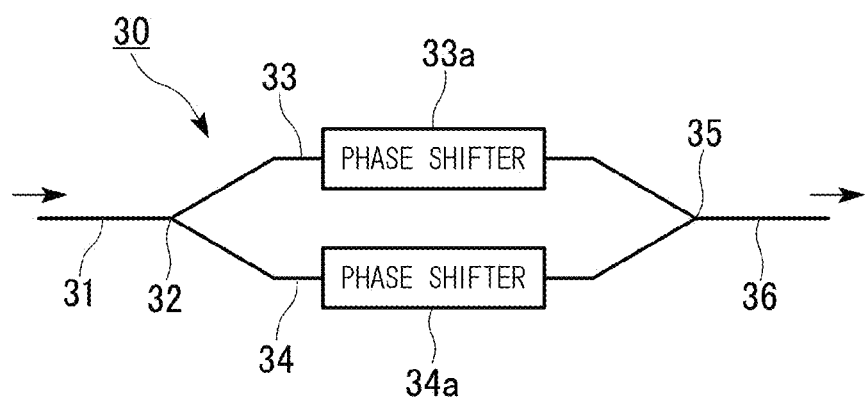
FIG. 10 is a schematic view showing an example of a Mach-Zehnder optical waveguide element.

An optical phase modulator may be used by itself in an optical transmission line. Particularly, in long-haul transmissions, it may be used as a Mach-Zehnder optical modulator in which an optical phase modulator is arranged in the arm of the Mach-Zehnder interferometer. FIG. 10 shows a schematic configuration of a Mach-Zehnder optical waveguide element 30. Light entering the Mach-Zehnder optical waveguide element 30 through an incident part 31 is demultiplexed into two lights by a demultiplexer 32, and the lights are guided through the respective arms 33 and 34. Each of the arms 33 and 34 is provided with a phase shifter so as to perform phase modulation in each of the arms 33 and 34. The lights passing through the arms 33 and 34 are multiplexed by a multiplexer 35 and output from an emission part 36. Therefore, it is possible to perform intensity modulation and phase modulation in accordance with the phase difference between the lights passing through the arms 33 and 34.

When reversing the phase shift direction between the arms 33 and 34, i.e., advancing the phase in one of the arm and delaying the phase in the other, it will be possible to perform a modulation while reducing frequency chirping of the output signal from Mach-Zehnder optical waveguide element 30 to the emission part 36. Particularly, in long-haul optical communications where the influence of the wavelength dispersion (frequency dispersion) of the optical waveguide is concerned, such a Mach-Zehnder optical modulation system capable of reducing the frequency chirping is used.

The optical element exemplified in the above-described first to sixth embodiments can be operated as an optical phase modulator with a single phase shifter. The seventh to ninth embodiments shown below are an example in which an optical element as exemplified in the first to sixth embodiments is applied to a Mach-Zehnder optical modulator.

<Seventh Embodiment>

Figure 11A:
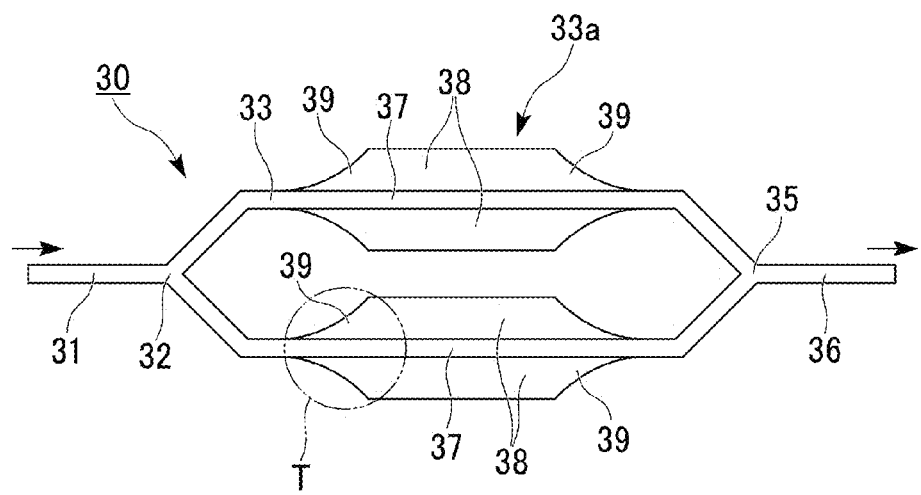
FIG. 11A is a plan view showing a Mach-Zehnder optical waveguide element according to the seventh embodiment of the present invention.
Figure 11B:
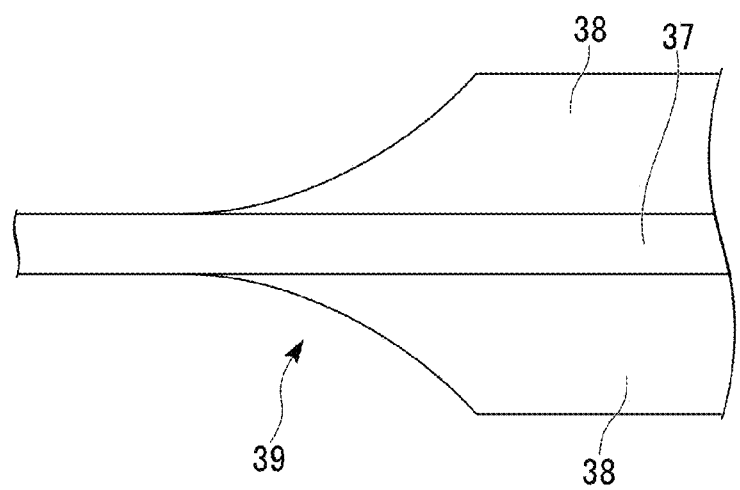
FIG. 11B is a partially enlarged view showing the T part of a Mach-Zehnder optical waveguide element according to the seventh embodiment of the present invention.

As shown in a plan view in FIGS. 11A and 11B, it is at least required to provide a rib part 37 and slab parts 38 and 38 on both side thereof in the phase shifter of each of the arms 33 and 34. Part of the waveguide other than the phase shifter may be a rib waveguide including a rib part and a slab part or a rectangular waveguide without a slab part. In FIGS. 11A and 11B, the structure of the core is shown in which a rectangular waveguide is used for the part other than the phase shifter. A semiconductor such as silicon may be used as the material of the core which is constituted by the rib part, the slab part, and the rectangular part. An insulator such as $SiO_2$ may be used as a cladding (not shown in the figures). The upper cladding may be an air cladding.

It should be noted that, in FIGS. 11A and 11B, the same reference numerals are given to the correspondent components as those shown in FIG. 10 and overlapping description will be omitted. It may be possible to integrate the incident part 31, the demultiplexer 32, the arms 33 and 34, the multiplexer 35, and the emission part 36 on the same substrate to constitute a substrate-type optical waveguide.

When performing phase modulation by the phase shifters 33a and 34a of the arms 33 and 34 and multiplexing by the multiplexer 35, the state of the output light from the emission part 36 will be changed in accordance with the phase difference between lights passing through the arms 33 and 34, which will achieve intensity modulation and phase modulation.

For example, given that the relative phase difference is π radian, the light waves passing through the arms 33 and 34 will be canceled with each other, which allow part of the power of the guided light to diffuse to the periphery of the core in the multiplexer 35, and thus reduce the power of light coupled to the emission part 36. On the other hand, when the phases of lights passing through the arms 33 and 34 are coincident to each other in the multiplexer 35, the light waves will be multiplexed without being canceled and coupled to the emission part 36. Such a modulation is called intensity modulation.

In particular, when activating the phase shifters 33a and 34a of the arms 33 and 34 at the same time and modulating guided lights in the arms 33 and 34 so as to reverse the phases therebetween, i.e., performing a push-pull operation in which one of the phases is advanced while the other is delayed, it is possible to output optical signals suitable for long-haul transmissions while reducing frequency chirping.

Next, each component of the Mach-Zehnder optical waveguide element 30 will be explained.

As for the incident part 31, an appropriate configuration may be employed in accordance with the type of the optical transmission path which is to be connected to the incident part 31. For example, in a case where the optical element 30 is directly connected to an optical fiber, a mode field converter may be used in order to reduce the connection loss due to the difference in mode field shape. Examples thereof include a mode field converter in which the core forms an inverse tapered shape toward the advancing direction of light. Alternatively, it may be possible to connect the optical element 30 with additional optical element which is formed on the same substrate. In this case, the core of the incident part 31 may be extended to be connected with the additional optical element. Of course, it may be possible to change the width, height, and the like of the waveguide in accordance with a waveguide to be connected.

The demultiplexer 32 allocates incident light to the two arms 33 and 34. As the demultiplexer 32, a Y-branched optical waveguide, an MMI (multimode interference) coupler, a directional coupler, or the like may be employed.

The multiplexer 35 multiplexes lights from the two arms 33 and 34 to the emission part 36. As the multiplexer 35, as with the demultiplexer 32, a Y-branched optical waveguide, an MMI coupler, a directional coupler, or the like may be employed. When reversing the direction of incident light and emitted light in the branched part of the demultiplexer, it can be used as the multiplexer 35. In the optical element 30, the demultiplexer 32 and the multiplexer 35 may have the same configuration or different configurations.

In the example shown in FIGS. 11A and 11B, the incident part 31 and the emission part 36 are a rectangular waveguide, and a rectangular waveguide is employed for the demultiplexer 32 and multiplexer 35 as well. In view of a waveguide on its own, it is generally known that a rib waveguide is lower in waveguide loss than a rectangular waveguide. The demultiplexer 32 and the multiplexer 35 may be a rib waveguide. Specifically, a Y-branched optical waveguide, an MMI coupler, a directional coupler, or the like may be formed from a rib waveguide.

In this case, a rib waveguide may be used for the incident part 31 and the emission part 36, or a rectangular rib converter may be formed between the incident part 31 and the demultiplexer 32 or between the multiplexer 35 and the emission part 36. The rectangular rib converter will be explained below.

For the phase shifters 33a and 34a arranged in the bifurcated arms 33 and 34, an optical phase modulator using an optical element according to the above-described embodiments of the present invention may be employed, for example.

In the examples shown in FIGS. 11A and 11B, the phase shifters 33a and 34a are arranged in the respective arms 33 and 34. For this reason, it is possible to perform an operation for chirp reduction. For a simple intensity modulation, it may be possible to provide a phase shifter in one of the arms. In this case, it is possible to achieve cost reduction because of reduction of manufacturing cost and the number of terminals for voltage application and simplification of control.

When applying an optical element according to the embodiments of the present invention to the Mach-Zehnder optical waveguide element 30, it is used for the phase shifters 33a and 34a at least in a form of a rib waveguide. Then, as shown in the first to sixth embodiments, the rib part 37 and the slab parts 38 and 38 located on both sides thereof are provided with the P-type region, the N-type region, the undoped region, and the electrodes for applying reverse bias.

Doping may suitably or may not be performed to the optical waveguide other than the phase shifters 33a and 34a. An optical element according to the embodiments of the present invention may be used in one of the arms 33 and 34 or both of the arms 33 and 34.

In the present embodiment, as shown in FIG. 11A, in each of the arms 33 and 34, a rectangular rib converter 39 is provided in the demultiplexer 32, between the phase shifters 33a and 34a, and between the phase shifters 33a and 34a and multiplexer 35.

In the rectangular rib converter 39, as shown in FIG. 11B, the slab parts 38 continuously extends from both side of the rectangular waveguide such that the width of the slab part 38 continuously becomes wider (or narrower) along the light guided direction. It is preferable that the length of the rectangular rib converter 39 in the light guided direction be sufficient for adiabatically performing the conversion of the guided mode from the rectangular waveguide to the rib waveguide. In practice, since the region at the right hand of FIG. 11B where the slab part 38 is wider is smaller in mode shape change than the region where the slab part 38 is narrower, the width of the slab part 38 can be widened more rapidly. In this case, it is possible to reduce the length of the rectangular rib converter 39.

The phase shifters 33a and 34a may be configured, for example, as shown in FIG. 12A, FIG. 12B, FIG. 15A, or FIG. 15B.

Each component of the phase shifters 33a and 34a may be formed of the materials exemplified in the first embodiment. Specifically, silicon (Si) may be used for the substrate 2 and the core of the arms 33 and 34, and silica ($SiO_2$) may be used for the lower cladding 3 and the upper cladding 5.

In the present embodiment, a phase shifter is arranged in both of the two arms 33 and 34. The positional relationship between the P-type region and the N-type region in the two phase shifter is reversed between FIG. 12A and FIG. 12B.

Specifically, in the case of FIG. 12A, both of the doping regions arranged between the arms 33 and 34 are an N-type region. For example, in a case where the optical element 1 in FIG. 1A is used for the phase shifters 33a and 34a, both second slab parts 12 of the phase shifters 33a and 34a are arranged between the arms 33 and 34. Both of the doping regions arranged outside the arms 33 and 34 are a P-type region.

On the other hand, in the case of FIG. 1213, both of the doping regions arranged between the arms 33 and 34 are a P-type region. For example, in a case where the optical element 1 in FIG. 1A is used for the phase shifters 33a and 34a, both first slab parts 11 of the phase shifters 33a and 34a are arranged between the arms 33 and 34. Both of the doping regions arranged outside the arms 33 and 34 are an N-type region.

As described above, when the two slab parts arranged between the arms 33 and 34 have the same type of doping region (any of P-type region or N-type region), the two slab parts between the arms 33 and 34 can be connected to an electrode common thereto.

In the case of FIG. 12A, a common GND can be arranged between the arms 33 and 34 (inside), and signal electrodes can be arranged outside thereof for driving the respective phase shifters 33a and 34a. In this case, since the electrode connected to the inside N-type regions is GND, negative voltage is applied to the signal electrodes connected to the outside P-type regions to apply reverse bias voltage. Contrary to the case of FIG. 12A, in a case where the signal electrodes are arranged in the inside and GND is arranged in the outside, positive voltage is applied to the signal electrodes to apply reverse bias voltage.

In the case of FIG. 12B, since the electrode connected to the inside P-type regions is GND, positive voltage is applied to the signal electrodes connected to the outside N-type regions to apply reverse bias voltage. Contrary to the example of FIG. 12B, in a case where the signal electrodes are arranged in the inside and GND is arranged in the outside, negative voltage is applied to the signal electrodes to apply reverse bias voltage.

Figure 13:
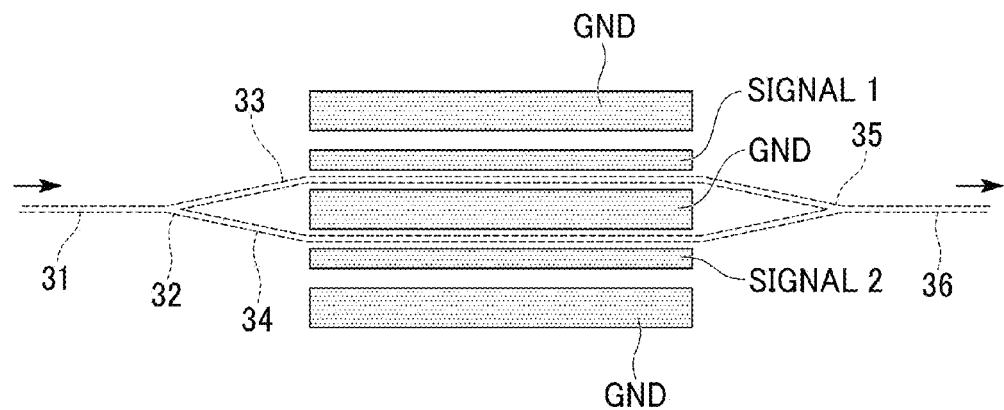
FIG. 13 is a plan view showing an example of an electrode arrangement in a Mach-Zehnder optical waveguide element.

For improving high frequency characteristic, it may be possible to use a traveling-wave electrode structure as explained with referring to FIG. 3. For example, as shown in FIG. 13, when arranging electrodes along the longitudinal direction of the waveguide, arranging other GNDs outside the signal electrodes, and suitably adjusting the width of the electrodes and the gap between the electrodes, a coplanar line will be configured. In this case, further high-speed transmission can be obtained.

Figure 14:
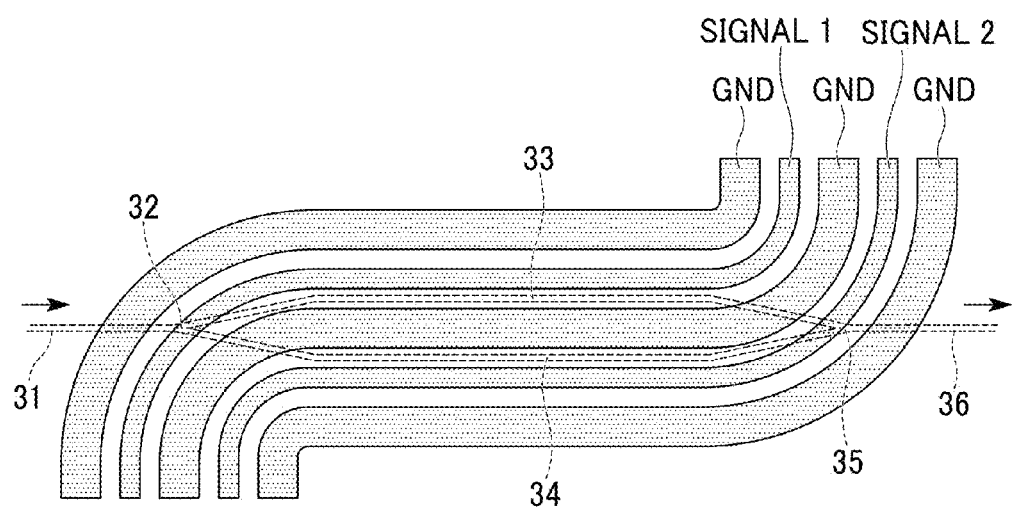
FIG. 14 is a plan view showing another example of an electrode configuration in a Mach-Zehnder optical waveguide element.

When configuring a device with consideration of packaging, each electrode may be arranged such that each end thereof is extended to the periphery as shown in FIG. 14. On this occasion, if the cross-section structure of each electrode is uniformly extended, it will be possible to maintain the impedance constant, and thus transmit drive signals while preventing unnecessary reflection.

Although FIGS. 12A-14 show a structure in which a common electrode is arranged between the arms 33 and 34, it may be possible to employ another structure in which two electrodes are arranged between the arms 33 and 34 so as to be able to drive the two phase shifters 33a and 34a separately. In this case, it is possible to reduce the coupling of voltage applied to the two phase shifters 33a and 34a.

Figure 15:
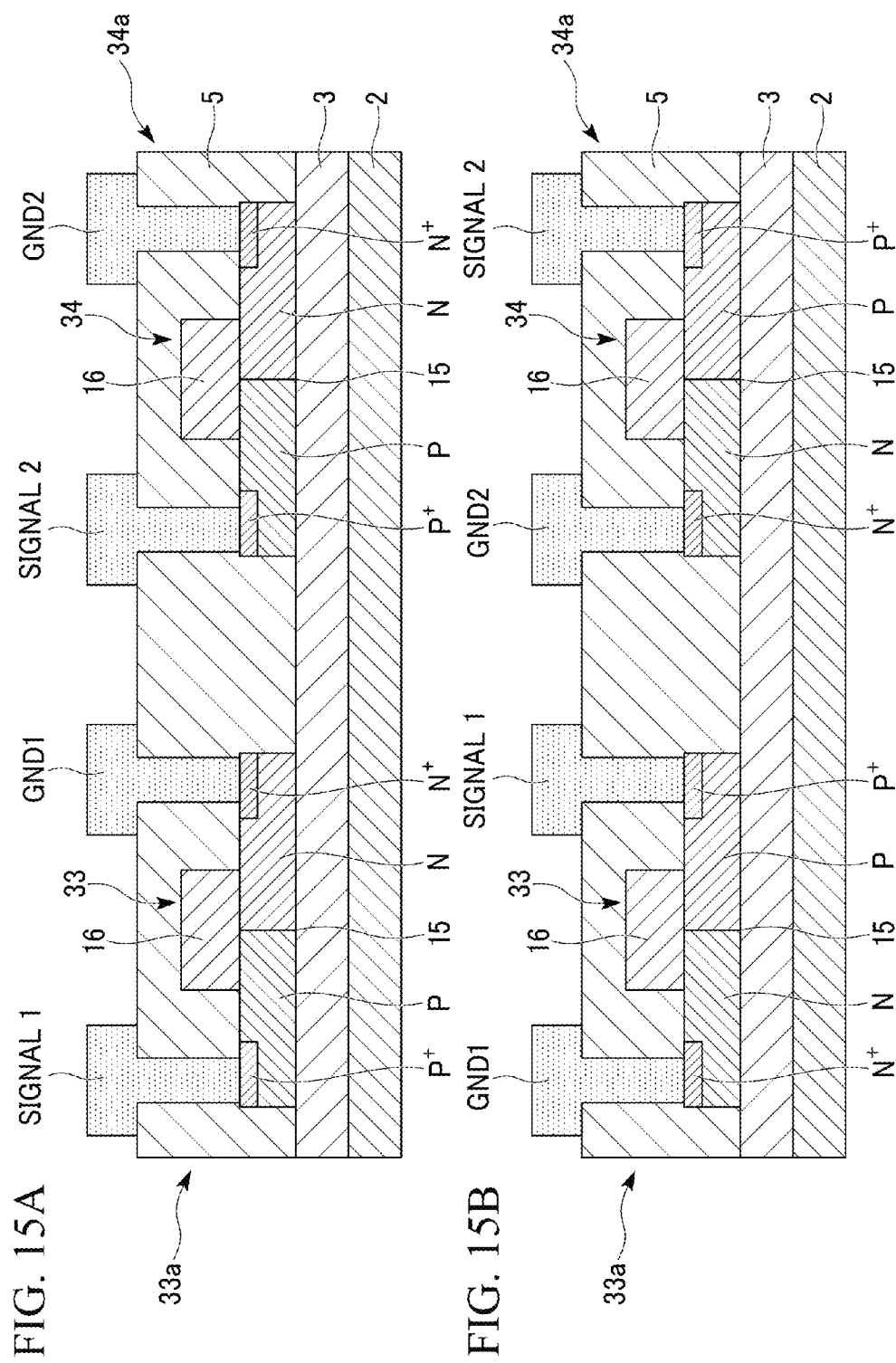
FIG. 15A is a cross-sectional view showing another example of the phase shifter shown in FIG. 11A.
FIG. 15B is a cross-sectional view showing another example of the phase shifter shown in FIG. 11A.

It may also be possible to employ another structure in which the arrangement order of the polarity of the doping regions in the core is PNPN or NPNP from the left to the right as shown in FIGS. 15A and 15B.

In FIG. 15A and FIG. 15B, since the electrode connected to the N-type region is GND, negative voltage is applied to the signal electrodes connected to the P-type regions to apply reverse bias voltage. Contrary to the examples of the figures, in a case where the electrode connected to the P-type region is GND, positive voltage is applied to the signal electrodes connected to the N-type region to apply reverse bias voltage.

<Optical Path Length Adjuster of Mach-Zehnder Optical Modulator>

In manufacturing a Mach-Zehnder optical modulator, a slight difference in optical path length between the two arms will occur due to the manufacturing error. In addition, the optical path-length difference will be changed depending on temperature, and thus it is preferable to adjust the optical path-length difference in accordance with the ambient temperature. For adjusting the optical path length of the arms, it may be possible to adjust DC (direct current) component in each of the phase shifters shown in the first to sixth embodiments in which reverse bias voltage is applicable.

However, since AC (alternate current) component will also be subject to influence at the same time as changing DC component, the above-described way may not be applicable for push-pull operations in which it is preferable that both arms have the same characteristics. For this reason, it may be possible to provide optical path length adjusters 33b and 34b in the arms 33 and 34 separately from the phase shifters 33a and 34a as shown in FIG. 16.

Figure 16:
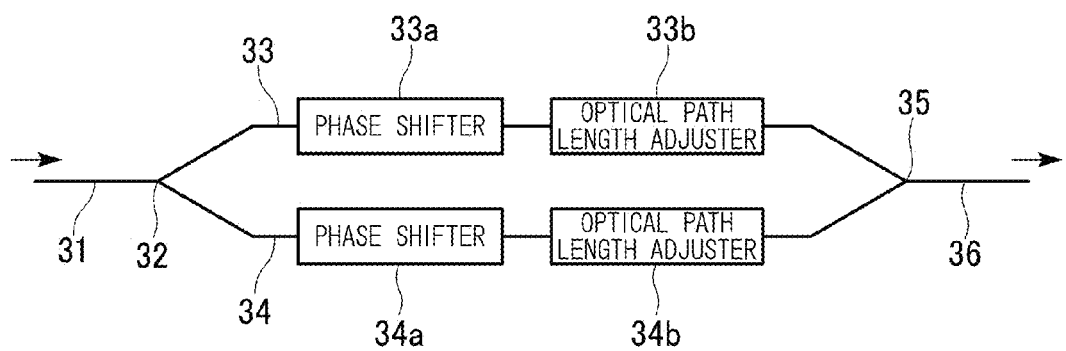
FIG. 16 is a schematic view showing an example of a Mach-Zehnder optical waveguide element including an optical path length adjuster.

In FIG. 16, the optical path length adjusters 33b and 34b are provided in the bifurcated arms 33 and 34, respectively. It is not required for the optical path length adjusters 33b and 34b to have high frequency characteristic and high-speed performance as long as they are capable of adjusting the optical path length of the arms in accordance with the ambient conditions such as temperature change. For this reason, it is not necessary to configure the optical path length adjusters 33b and 34b so as to be controlled by application of reverse bias voltage, and it may be possible to configure them from a phase modulation device exhibiting thermo-optical effect.

A specific example of a phase modulation device exhibiting thermo-optical effect is configured by providing around an optical waveguide a conductor, such as deposited nichrome serving as an electrically-heated wire and silicon doped with impurities, so as to be capable of controlling the temperature of the optical waveguide. The conductor may be provided outside the cladding (e.g., on the upper cladding), or may be provided in the slab part if it is apart from the region where the guided light will be distributed. In addition, it is preferable that the conductor be provided along the longitudinal direction of the optical waveguide and have a predetermined length.

The optical path length adjusters 33b and 34b exhibiting thermo-optical effect is unsuitable for high-speed performance but can be a low-loss optical path length adjuster because of no loss due to the carrier absorption.

Although the optical path length adjusters 33b and 34b are provided in the arms 33 and 34 in FIG. 16, it may be possible to provide the optical path length adjuster in only one of the arms.

The above has described the present invention based on the preferred embodiments but the present invention is not limited to the embodiments described above and various design modifications may be made without departing from the scope of the present invention.

The above-described embodiments have a cross-section structure in which the rib protrudes upwardly, but it may be possible to employ a cross-section structure in which the rib protrudes downwardly or protrude upwardly and downwardly. In these cross-section structures, when providing a PN-junction part and an undoped region inside the rib in the same way, the carriers will diffuse to the undoped region, the proportion of the region in which the carrier density is changed by voltage application will be increased, and thus the same effects will be obtained as in the cross-section structure in which the rib protrudes upwardly.

EXAMPLES

An example of the present invention will be explained below.

<Comparison by Simulation>

Figure 18:
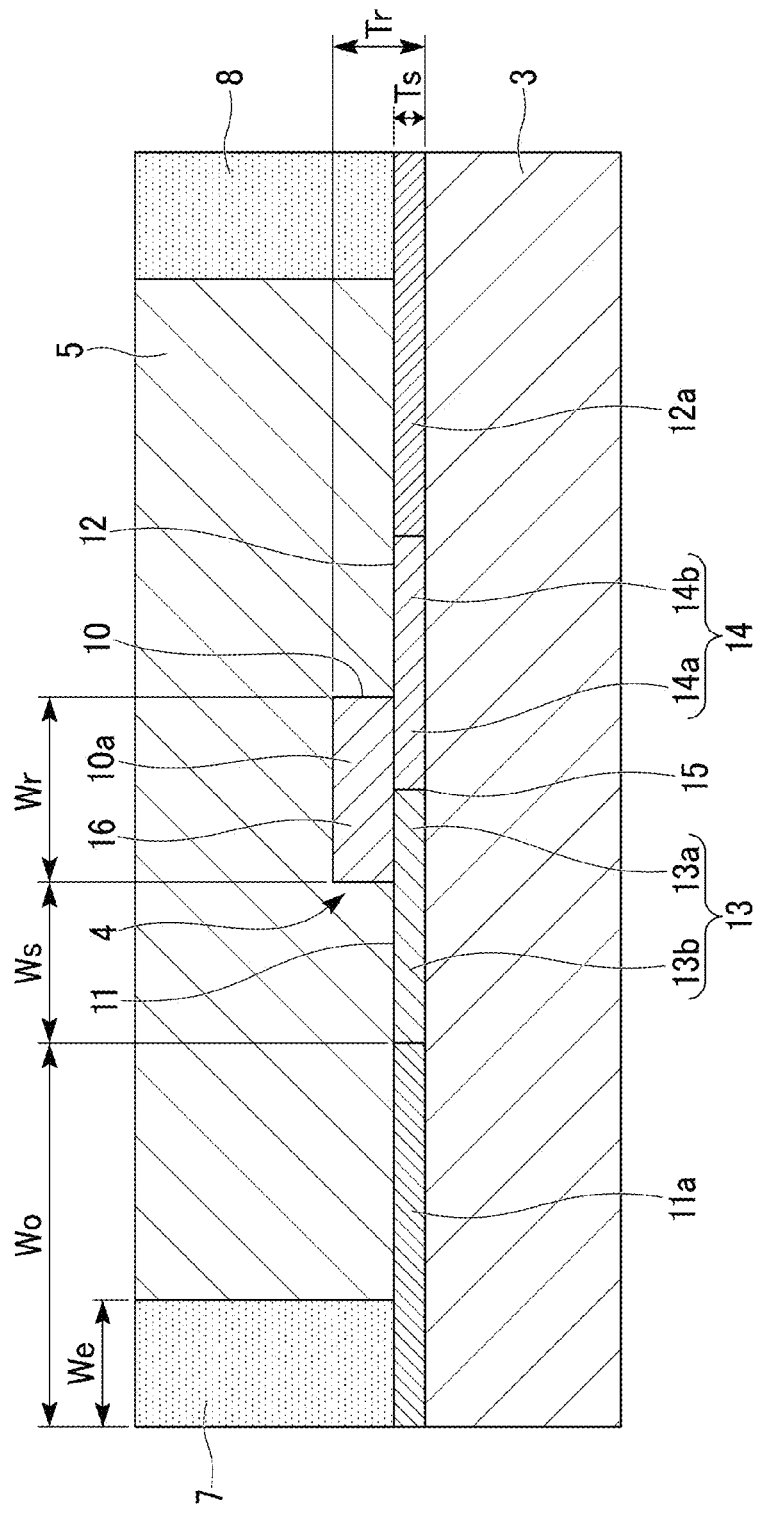
FIG. 18 is a cross-sectional view showing a cross-section structure of Example 1.

FIG. 18 shows a cross-section structure of an optical waveguide used in a simulation (Example 1). The width of the rib part 10 is $W_r$=600 nm, the rib thickness is $T_r$=220 nm, the slab thickness is $T_s$=90 nm, and the height of the rib protruded from the slab is $T_r-T_s$=130 nm. The core 4 was formed of silicon (Si), and it was configured such that the upper cladding 5 and the lower cladding 3, made of silica ($SiO_2$), cover the top and the bottom of the core 4, respectively.

In addition, doping was performed to the core 4 in a range from the bottom face of the core 4 to 90 nm height which is equal to the slab thickness $T_s$, in which the doping concentration in the P-type region 13 was made to be $5\times10^{17}/cm^3$ while the doping concentration in the N-type region 14 was made to be $2\times10^{17}/cm^3$.

The contact parts 11a and 12a for making contact with the electrodes 7 and 8 were formed in a high-concentration doping region of $1\times10^{20}/cm^3$ together with the $P^+$ region and the $N^+$ region, and arranged apart from the rib end by a distance of $W_s$=600 nm towards the electrodes 7 and 8 so as to be sufficiently separated from the region where guided light will be distributed. In this case, the distance between the contact parts 11a and 12a and the PN-junction part 15 is $W_s+(W_r/2)$ =900 nm. The width of the contact parts 11a and 12a was made to be $W_o$=4000 nm while the width of the electrodes 7 and 8 was made to be $W_e$=1000 nm.

Figure 19A:
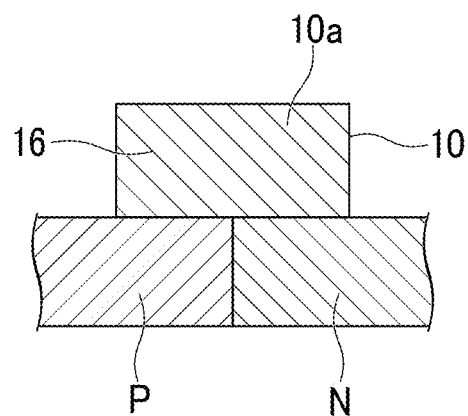
FIG. 19A is a cross-sectional view showing a cross-section structure of the center part of the core in Example 1.

In Example 1, as with the first embodiment, doping was performed to the lower part of the rib part 10 from the bottom face thereof to the height which is the same as the slab thickness $T_s$, while the undoped region 16 made of intrinsic silicon was arranged in the upper part thereof as shown in FIG. 19A.

Figure 19B:
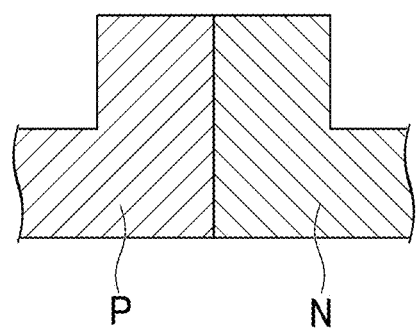
FIG. 19B is a cross-sectional view showing a cross-section structure of the center part of the core in Comparative example 1.

In Comparative example 1, as with Patent Document 1, P-type and N-type doping regions were arranged from the bottom face to the top face of the rib so as to have an uniform concentration as shown in FIG. 19B. The doping concentration was the same as in Example 1 (P-type: $5\times10^{17}/cm^3$, N-type: $2\times10^{17}/cm^3$).

(Simulation Method)

Simulations were performed as follows.

1. Change of the carrier density distribution was calculated in each predetermined bias voltage. A simulator ATLAS produced by Silvaco was used for the calculation.

2. From the carrier density distribution obtained in 1., the carrier densities were converted into the complex refractive indices using the above-described Equation 1 and Equation 2.
3. From the complex refractive index distribution obtained in 2., the effective refractive index and the effective extinction coefficient of the optical waveguide were calculated. A simulator BeamProp produced by Rsoft was used for the calculation.

(Simulation of Insertion Loss)

In accordance with the above-described steps 1.-3. of the simulation method, simulations with regard to the loss of the phase shifters were performed under the following conditions.

Target phase shift amount: $0.5\pi$

Operating voltage (Bias): 0 to $-4$ V

In this case, as explained above with referring to Equation 6 and Equation 7, when the wavelength and the length of the waveguide are determined, the ratio of the phase shift amount to the waveguide loss can be used as an index instead of the ratio of the change in effective refractive index to the waveguide loss. Therefore, in the present simulation, the wavelength is set to be 1550 nm while the length of the waveguide is set to be a length with which a phase shift amount of $0.5\pi$ is obtained.

Each phase shift amount per unit length, waveguide loss (with bias voltage of $-4$ V), and change in waveguide loss (insertion loss variation with operating voltage from 0 to $-4$ V) were calculated and are shown in Table 1.

TABLE 1

| per unit length | Comparative Example 1 | Example 1 |
|---|---|---|
| Phase shift amount | 0.30 rad/mm | 0.18 rad/mm |
| Waveguide loss (with $-4$ V bias) | 0.58 dB/mm | 0.21 dB/mm |
| Change in waveguide loss | $-0.26$ dB/mm | $-0.14$ dB/mm |

It should be noted that, with regard to the waveguide loss shown in Table 1, only the loss due to the carrier absorption was taken into consideration, but other losses caused in actual devices such as losses due to absorption by materials and diffusion caused by microscopic unevenness in the core-cladding boundary of the waveguide were not taken into consideration.

Therefore, in view of actually measured values in actual devices, "waveguide loss considering all factors" was calculated by adding a loss amount of 0.06 dB to the above-described results. The results are shown in Table 2 as waveguide loss (total).

TABLE 2

| per unit length | Comparative Example 1 | Example 1 |
|---|---|---|
| Waveguide loss (total) | 0.64 dB/mm | 0.27 dB/mm |

From the phase shift amount per unit length shown in Table 1, the length of the waveguide for obtaining the target shift amount of $0.5\pi$ can be calculated. Accordingly, phase shifters having a suitable waveguide length for $0.5\pi$ shift were designed, and each length of the waveguide, waveguide loss, and change in waveguide loss were calculated. The results are shown in Table 3.

TABLE 3

| $0.5\pi$ shift | Comparative Example 1 | Example 1 |
|---|---|---|
| Waveguide length | 5.7 mm | 8.8 mm |
| Waveguide loss (with $-4$ V bias) | 3.36 dB | 2.36 dB |
| Change in waveguide loss | 1.40 dB | 1.26 dB |

From the results shown in Table 3, the insertion loss and the change in loss during operation in the Example 1 are reduced compared to Comparative example 1 for the same phase shift amount.

(Simulation of Response Speed)

Next, simulations with regard to response speed were performed.

The response speed can be calculated as a time required for obtaining a change in refractive index in accordance with bias voltage after abrupt change of voltage is given.

As with the above-described simulation method, based on a carrier density distribution calculated using the simulator ATLAS produced by Silvaco, the effective refractive index and the effective extinction coefficient of guided mode were calculated using a simulator BeamProp produced by Rsoft.

Figure 20:
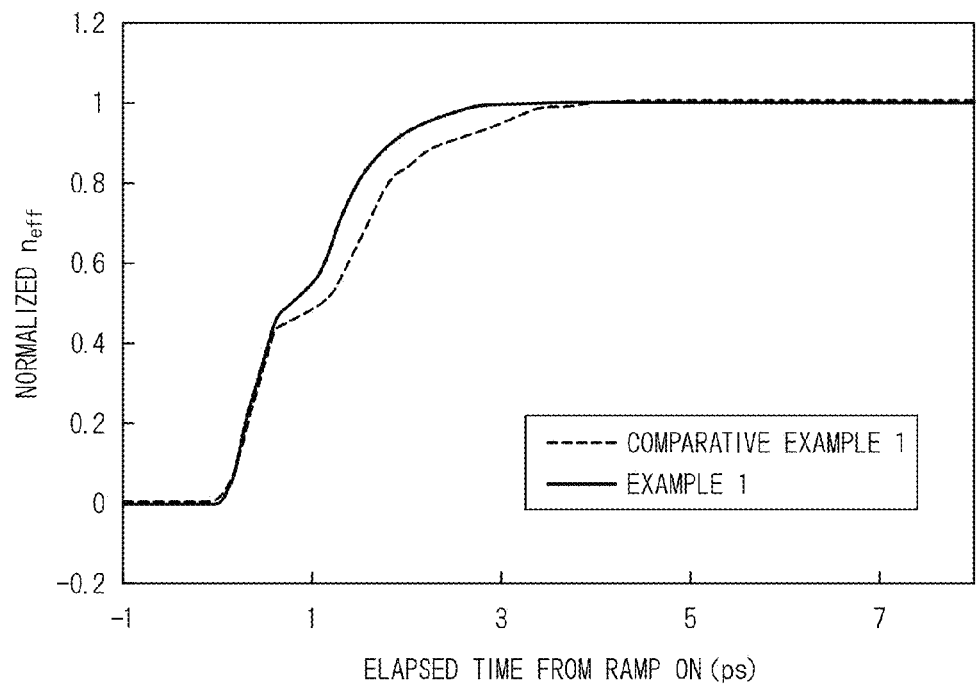
FIG. 20 is a graph showing the change in effective refractive index when varying the bias from 0 V to −4 V.
Figure 21:
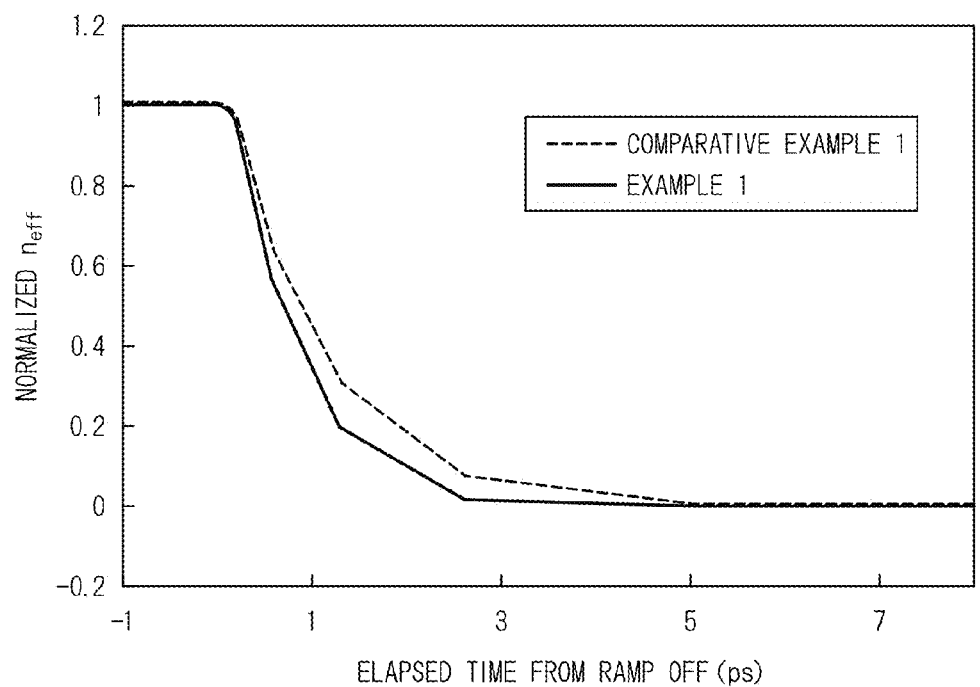
FIG. 21 is a graph showing the change in effective refractive index when varying the bias from −4 V to 0 V.
Figure 22A:
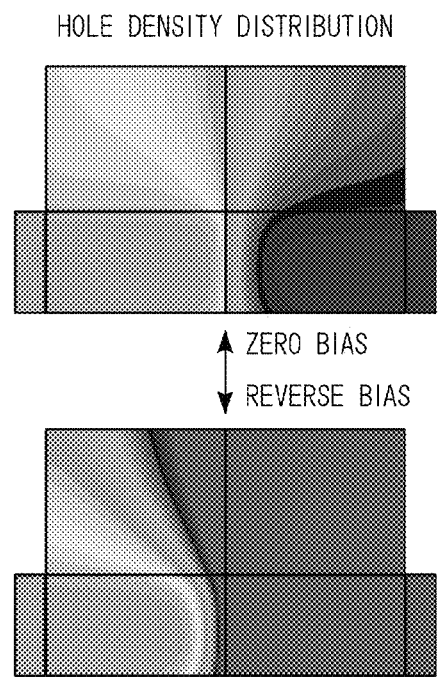
FIG. 22A is a drawing-substituting photograph showing the results of the simulation for the carrier density distribution in Example 1.
Figure 22B:
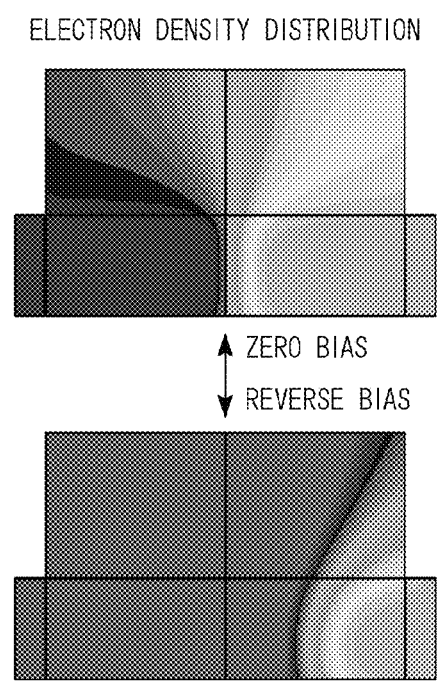
FIG. 22B is a drawing-substituting photograph showing the results of the simulation for the carrier density distribution in Example 1.
Figure 23A:
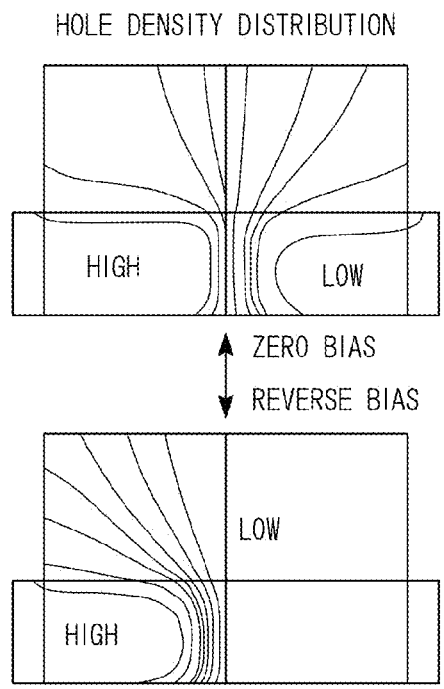
FIG. 23A is a schematic view illustrating the results of the simulation of FIG. 22A.
Figure 23B:
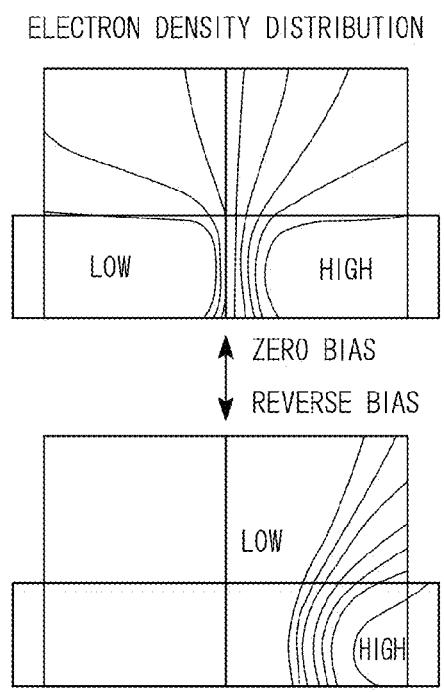
FIG. 23B is a schematic view illustrating the results of the simulation of FIG. 22B.
Figure 24A:
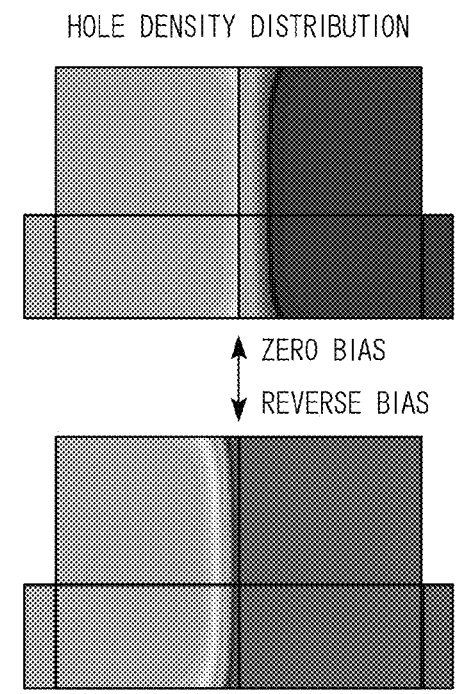
FIG. 24A is a drawing-substituting photograph showing the results of the simulation for the carrier density distribution in Comparative example 1.
Figure 24B:
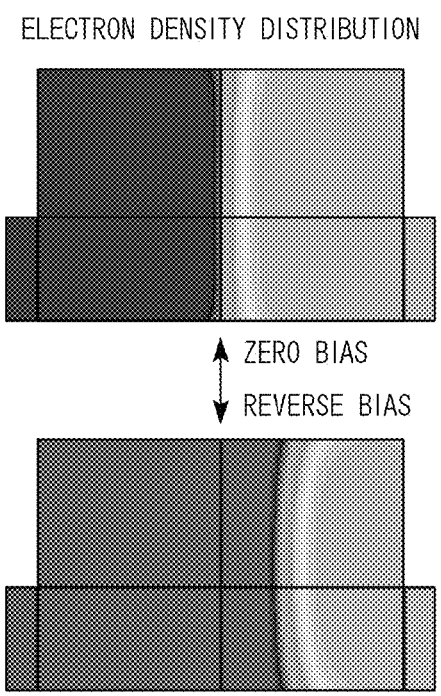
FIG. 24B is a drawing-substituting photograph showing the results of the simulation for the carrier density distribution in Comparative example 1.
Figure 25A:
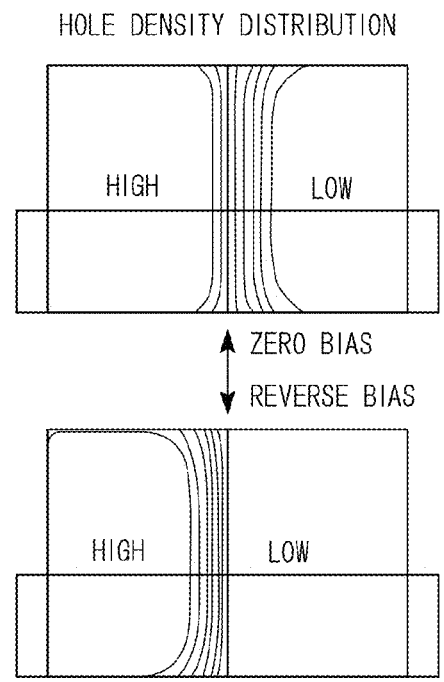
FIG. 25A is a schematic view illustrating the results of the simulation of FIG. 24A.
Figure 25B:
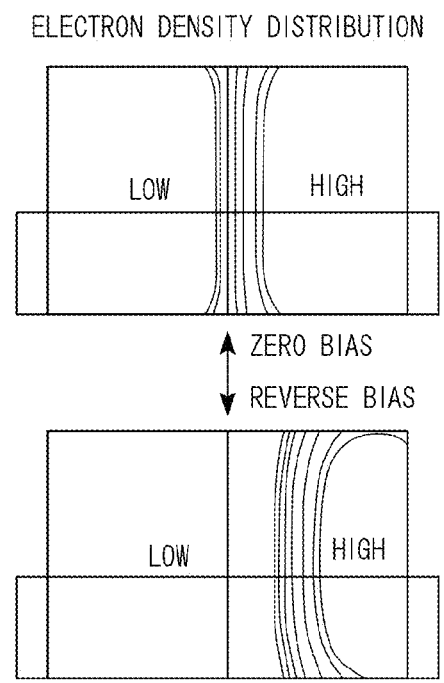
FIG. 25B is a schematic view illustrating the results of the simulation of FIG. 24B.

FIG. 20 shows the change in effective refractive index $n_{eff}$ when the bias voltage is changed from 0 V to $-4$ V (Ramp on), and FIG. 21 shows the change in effective refractive index $n_{eff}$ when the bias voltage is changed from $-4$ V to 0 V (Ramp off). In FIGS. 20-21, the horizontal axis represents elapsed time with 0 (ps) being the time the abrupt change of voltage was given. On the other hand, the vertical axis represents the effective refractive index $n_{eff}$ normalized such that the effective refractive index with 0 V application, at which the refractive index is low, is 0 and the effective refractive index with $-4$ V application, at which the refractive index is high, is 1.

For the purpose of estimating each response time, the time required for the normalized effective refractive index changing between 10% and 90% (from 0.1 to 0.9, or from 0.9 to 0.1) were compared as shown in Table 4.

TABLE 4

|  | 0 V to $-4$ V | $-4$ V to 0 V |
|---|---|---|
| Example 1 | 1.65 ps | 1.73 ps |
| Comparative Example 1 | 2.30 ps | 2.16 ps |

From the results shown in FIGS. 20-21 and Table 3, it is found that Example 1 is shorter in response time than Comparative example 1 and thus makes it possible to achieve further high speed communication and provide a device capable of being operated at high speed.

(Simulation of Carrier Distribution)

The calculation results of the carrier distribution performed in the above-described simulation method 1. are shown in FIGS. 22A-23B for Example 1, and in FIGS. 24A-25B for Comparative example 1. It should be noted that the rib width is 600 nm, the rib thickness is 220 nm, and the slab thickness is 90 nm as described above. In FIGS. 22A-25B, the scale size of the height and that of the width differ from each other.

In Example 1, as shown in FIGS. 22A-23B, it is found that the change in carrier density occurs even in the undoped region in the upper part of the rib and great change in carrier density occurs over the entire rib. In the case of Comparative example 1, as shown in FIGS. 24A-25B, the carrier density with reverse bias application is relatively large at the top end and the bottom end of the rib and is small in the center of the rib.

<Comparison in Actual Measurement for Fabricated Device>

A device according to the first embodiment (Example 2) was fabricated so as to have the cross-section structure shown in FIG. 2A. The rib width is 600 nm, the rib thickness is 220 nm, and the slab thickness is 95 nm.

In the fabrication method, the following steps (1)-(6) are performed which are shown in FIGS. 4A-4F.

(1) Preparing an SOI substrate and polishing the substrate by CMP so as to make the upper Si layer thereof be 220 nm.
(2) Covering with a mask the region in which an N-type region is to be formed, and performing implantation of boron (B) as a P-type dopant with dosage of $5 \times 10^{12}/cm^3$ and implantation energy of 40 eV to form a P-type region such that only the height range corresponding to the slab thickness is doped.
(3) Covering with a mask the region in which the P-type region is formed, and performing implantation of phosphorus (P) as an N-type dopant with dosage of $3 \times 10^{12}/cm^3$ and implantation energy of 110 eV to form a N-type region such that only the height range corresponding to the slab thickness is doped.
(4) Forming by etching a core having a rib in the cross section thereof, and then forming a high-concentration doping region in the upper part of the slab part by doping.
(5) Depositing $SiO_2$ on the core to form an upper cladding.
(6) Forming contact holes in the upper cladding, and then filling the formed contact holes with aluminum (Al) by sputtering to form electrodes.

In Example 2, the implantation energy in (2) and (3) was adjusted such that an undoped region is provided in the upper part of the rib as shown in FIG. 19A by etching of (4).

In Comparative example 2, the implantation energy in (2) and (3) was adjusted such that the doping is performed up to the top end of the rib as shown in FIG. 19B.

For each fabricated device, DC bias was applied to measure the phase shift amount and the waveguide loss of the device. As shown in the above-described Equation 6 and Equation 7, it is possible to examine the phase modulation efficiency by measuring the phase shift amount per unit length instead of investigating the change in effective refractive index.

The measurement conditions are that the bias voltage is 0 to −4 V and the wavelength is 1550 nm. The phase shift amount per unit length and the waveguide loss were each obtained by dividing the measured value by the length of the waveguide. The results are shown in Table 5.

TABLE 5

| per unit length | Comparative Example 2 | Example 2 |
|---|---|---|
| Phase shift amount | 1.02 rad/mm | 0.53 rad/mm |
| Waveguide loss | 0.72 dB/mm | 0.27 dB/mm |

In addition, the length of the waveguide and the waveguide loss required for obtaining a phase shift amount of π radian were each calculated and are in Table 6.

TABLE 6

| π shift | Comparative Example 2 | Example 2 |
|---|---|---|
| Waveguide length | 3.1 mm | 6.0 mm |
| Waveguide loss | 2.2 dB | 1.6 dB |

From the results shown in Table 6, it is found that Example 2 is lower in waveguide loss than Comparative example 2 for the same phase shift amount, and thus makes it possible to achieve low loss.

According to the aspects of the present invention, it is possible to provide an optical element and a Mach-Zehnder optical waveguide element using the same which make it possible to reduce the amount of the change in loss due to the change in carrier density and reduce the insertion loss.

What is claimed is:

1. An optical element comprising an optical waveguide comprising a core formed from: a rib part; and a first and second slab parts which are located on both sides of the rib part so as to sandwich the rib part and thinner than the rib part, wherein
    the rib part and the first and second slab parts of the core are integrally formed by a semiconductor single crystal,
    the first slab part comprises a P-type region which is doped to be P type,
    the second slab part comprises an N-type region which is doped to be N type,
    the rib part comprises a P-type region which is in contact with the P-type region provided in the first slab part, and an N-type region which is in contact with the N-type region provided in the second slab part,
    the P-type region and the N-type region of the rib part are in contact with each other to constitute a PN junction part,
    the rib part comprises a top portion which is located above the first and second slab parts in a cross section perpendicular to the longitudinal direction of the optical waveguide, and
    the top portion of the rib part comprises an undoped region formed from at least one of an intrinsic region and a low-concentration doping region which is doped at a dopant concentration 1/10 or less of a dopant concentration in at least one of the adjacent P-type region and the adjacent N-type region.

2. The optical element according to claim 1, wherein a boundary between the P-type region and the N-type region in the rib part is perpendicular to a bottom face of the core in the cross section perpendicular to the longitudinal direction of the optical waveguide.

3. The optical element according to claim 1, wherein the P-type region of the rib part is located at the same height as the first slab part, and
    the N-type region of the rib part is located at the same height as the second slab part.

4. The optical element according to claim 1, wherein
    the P-type region of the rib part extends to a position higher than a top face of the first slab part, and
    the N-type region of the rib part extends to a position higher than a top face of the second slab part.

5. The optical element according to claim 1, wherein
    a dopant concentration of a collective P-type region which is constituted by the P-type region of the first slab part and the P-type region of the rib part decreases towards the PN-junction part in the cross section perpendicular to the longitudinal direction of the optical waveguide, and
    a dopant concentration of a collective N-type region which is constituted by the N-type region of the second slab part and the N-type region of the rib part decreases towards the PN-junction part in the cross section perpendicular to the longitudinal direction of the optical waveguide.

6. The optical element according to claim 5, wherein
    the collective P-type region comprises two or more regions which are different in dopant concentration from each other, and the collective N-type region comprises two or more regions which are different in dopant concentration from each other.

7. The optical element according to claim 1, further comprising a first electrode and a second electrode formed of metal, wherein
the P-type region of the first slab part is connected to the first electrode and comprises a P+ region which is higher in doping concentration than the P-type region of the first slab part, and
the N-type region of the second slab part is connected to the second electrode and comprises an N+ region which is higher in doping concentration than the N-type region of the second slab part.

8. The optical element according to claim 7, wherein the first electrode and the second electrode are a traveling-wave electrode which is continuously formed along the longitudinal direction of the optical waveguide.

9. The optical element according to claim 8, wherein the traveling-wave electrode constitutes a coplanar line electrode or a slot line electrode.

10. A Mach-Zehnder optical waveguide element in which two arms are integrated on the same substrate, wherein the optical element according to claim 1 is used in an optical waveguide of at least one of the two arms.

11. A Mach-Zehnder optical waveguide element in which two arms are integrated on the same substrate, wherein,
the optical element according to claim 1 is used in an optical waveguide of the two arms, and
the first slab part of each optical element used in each optical waveguide is arranged between the two arms, or the second slab part of each optical element is arranged between the two arms.

12. The optical element according to claim 1, wherein the optical waveguide forms a ring shape in which a starting point and an end point thereof are connected to each other in the longitudinal direction thereof.

* * * * *